United States Patent
Tsunematsu et al.

(10) Patent No.: US 10,752,512 B2
(45) Date of Patent: Aug. 25, 2020

(54) COMPOSITE TUNGSTEN OXIDE ULTRAFINE PARTICLES AND DISPERSION LIQUID OF THE SAME

(71) Applicant: SUMITOMO METAL MINING CO., LTD., Tokyo (JP)

(72) Inventors: Hirofumi Tsunematsu, Isa (JP); Hiroki Nakayama, Isa (JP); Takeshi Chonan, Isa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 16/063,529

(22) PCT Filed: Dec. 19, 2016

(86) PCT No.: PCT/JP2016/087795
§ 371 (c)(1),
(2) Date: Jun. 18, 2018

(87) PCT Pub. No.: WO2017/104853
PCT Pub. Date: Jun. 22, 2017

(65) Prior Publication Data
US 2018/0370813 A1 Dec. 27, 2018

(30) Foreign Application Priority Data

Dec. 18, 2015 (JP) .................................. 2015-247928
Apr. 1, 2016 (JP) .................................. 2016-073837

(51) Int. Cl.
C08K 3/22 (2006.01)
C01G 41/00 (2006.01)
C09K 3/00 (2006.01)
G02B 5/20 (2006.01)

(52) U.S. Cl.
CPC ........... *C01G 41/006* (2013.01); *C01G 41/00* (2013.01); *C08K 3/22* (2013.01); *C09K 3/00* (2013.01); *G02B 5/208* (2013.01); *C01P 2002/30* (2013.01); *C01P 2002/52* (2013.01); *C01P 2002/54* (2013.01); *C01P 2002/60* (2013.01); *C01P 2002/72* (2013.01); *C01P 2002/74* (2013.01); *C01P 2004/62* (2013.01); *C01P 2004/64* (2013.01); *C01P 2006/12* (2013.01); *C08K 2003/2258* (2013.01); *C08K 2201/011* (2013.01)

(58) Field of Classification Search
CPC combination set(s) only.
See application file for complete search history.

(56) References Cited

U.S. PATENT DOCUMENTS

| 6,060,154 | A | 5/2000 | Adachi et al. |
| 6,329,061 | B2 | 12/2001 | Kondo |
| 8,853,314 | B2 | 10/2014 | Mamak et al. |
| 2011/0248225 | A1 | 10/2011 | Mamak et al. |
| 2015/0024211 | A1 | 1/2015 | Miratsu et al. |

FOREIGN PATENT DOCUMENTS

| EP | 1801815 | * | 6/2007 |
| EP | 1801815 A1 | | 6/2007 |
| EP | 2360220 A1 | | 8/2011 |
| EP | 2818519 A1 | | 12/2014 |
| JP | H02-136230 A | | 5/1990 |
| JP | H08-259279 A | | 10/1996 |
| JP | H11-181336 A | | 7/1999 |
| JP | 2005-187323 A | | 7/2005 |
| JP | 2009-215487 A | | 9/2009 |
| JP | 2010-265144 A | | 11/2010 |
| JP | 2012-506463 A | | 3/2012 |
| JP | 2012-532822 A | | 12/2012 |
| JP | 2013-170239 A | | 9/2013 |
| WO | 2005/037932 A1 | | 4/2005 |
| WO | 2015/186663 A1 | | 12/2015 |

OTHER PUBLICATIONS

Jul. 5, 2019 Extended Search Report issued in European Patent Application No. 16875827.4.
Jan. 31, 2017 Search Report issued in International Patent Application No. PCT/JP2016/087795.
May 12, 2020 Office Action issued in Japanese Patent Application No. 2017-556492.

* cited by examiner

*Primary Examiner* — Monique R Peets
(74) *Attorney, Agent, or Firm* — Oliff PLC

(57) ABSTRACT

A general-purpose composite tungsten oxide ultrafine particles capable of producing a dispersion liquid with high productivity while having properties such as good visible light transmittance and shielding light in a near-infrared region, and a composite tungsten oxide ultrafine particle dispersion liquid using the same, wherein a value of an XRD peak top intensity ratio of the composite tungsten oxide ultrafine particles is 0.13 or more when the XRD peak intensity is set to 1, with plane of a silicon powder standard sample (640 c produced by NIST) as a reference.

10 Claims, 2 Drawing Sheets

COMPOSITE TUNGSTEN OXIDE ULTRAFINE PARTICLES AND DISPERSION LIQUID OF THE SAME

TECHNICAL FIELD

The present invention relates to general-purpose composite tungsten oxide ultrafine particles capable of producing a dispersion liquid with high productivity while having properties such as good visible light transmittance and shielding light in a near-infrared region, and a dispersion liquid of the same.

DESCRIPTION OF RELATED ART

Various techniques have been proposed as a near-infrared shielding technique of lowering solar radiation transmittance while maintaining transparency while having good visible light transmittance and maintaining transparency. Among them, the near-infrared shielding technique using conductive fine particles, which are inorganic substances, has merits such as excellent near-infrared shielding properties, low cost, having radio wave transmittance, and further having high weather resistance compared with other techniques.

For example, patent document 1 discloses a technique applying near-infrared shielding properties of tin oxide fine powder, and discloses a near-infrared shielding synthetic resin molded article formed by molding a transparent resin in which tin oxide fine powder is contained in a dispersed state or a transparent synthetic resin in which tin oxide fine powder is contained in a dispersed state into a sheet or film, and laminating it on a transparent synthetic resin substrate.

Patent document 2 discloses a technique applying the near-infrared shielding properties of metals such as Sn, Ti, Si, Zn, Zr, Fe, Al, Cr, Co, Ce, In, Ni, Ag, Cu, Pt, Mn, Ta, W, V, Mo, oxides of the metals, nitrides of the metals, sulfides of the metals, dopants of Sb or F to the metals, or a mixture thereof, and discloses a laminated glass sandwiching an intermediate layer in which the above substances are dispersed in a medium.

Further, an applicant discloses in patent document 3 a technique applying the near-infrared shielding properties of titanium nitride fine particles and lanthanum boride fine particles, and discloses a selectively transmittable film coating liquid or a selectively transmittable film in which at least one of these substances is dispersed in a solvent or a medium.

However, according to the study by the applicant, there is a problem that in each case of the near-infrared shielding structure such as the near-infrared shielding synthetic resin molded article disclosed in patent documents 1 to 3, the near-infrared shielding property is not sufficient when high visible light transmittance is required, and a function as the near-infrared shielding structure is not sufficient. For example, as a an example of a specific value of the near-infrared shielding property of the near-infrared shielding structure disclosed in patent documents 1 to 3, a solar radiation transmittance (sometimes referred to simply as "solar radiation transmittance" in the present invention) calculated based on JIS R 3106 exceeds 50%, when a visible light transmittance (sometimes referred to simply as "visible light transmittance" in the present invention) calculated similarly based on JIS R 3106 is 70%.

Therefore, the applicant disclosed in patent document 4 a technique applying composite tungsten oxide fine particles expressed by a general formula $M_xW_yO_z$ (wherein M element is an element of one or more kinds selected from H, He, alkali metal, alkaline earth metal, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, satisfying $0.001 \leq x/y \leq 1$, $2.2 \leq z/y \leq 3.0$) as near-infrared shielding fine particles, and discloses a method for producing the composite tungsten oxide fine particles and a near-infrared shielding dispersion body containing one or more kinds of composite tungsten oxide fine particles in which the composite tungsten oxide has a hexagonal, tetragonal, or cubic crystal structure, and a particle size of each near-infrared shielding material fine particle is 1 nm or more and 800 nm or less.

As disclosed in patent document 4, the near-infrared shielding fine particle dispersion body containing the composite tungsten oxide fine particles expressed by the general formula $M_xW_yO_z$ exhibits high near-infrared shielding properties, in which the solar radiation transmittance is improved to less than 50% when the visible light transmittance is 70%. Particularly, the near-infrared shielding fine particle dispersion body using composite tungsten oxide fine particles having at least one kind selected from specific elements such as Cs, Rb, Tl as M element and having a hexagonal crystal structure, exhibits excellent near-infrared shielding properties, in which the solar radiation transmittance is improved to less than 37% when the visible light transmittance is 70%. With this achievement, it has been studied to perform a hard coat treatment or the like to the near-infrared shielding fine particle dispersion body and to apply this near-infrared shielding fine particle dispersion body to applications such as a window glass and a plasma display panel.

On the other hand, in these applications, high transparency (low haze value) is required together with near-infrared shielding properties, and therefore attempts have been made to further miniaturize the particle size of the composite tungsten oxide fine particles for the purpose of lowering a haze value, and the haze value can be lowered by miniaturizing the particle size.

However, in the near-infrared shielding fine particle dispersion body in which the composite tungsten oxide fine particles are dispersed, a phenomenon of discoloring to bluish white color (so-called blue haze phenomenon) is confirmed when it is irradiated with sunlight or spotlight light, etc. Due to this phenomenon, in a case of using the near-infrared shielding fine particle dispersion body in which the composite tungsten oxide fine particles are used, as a windshield of a vehicle or the like, discoloring to bluish white color occurs under sunlight, resulting in poor visibility, thereby causing concern about safety. Further, in a case of being used as a windowpane, etc., for building materials or the like, the appearance is impaired due to the occurrence of the blue haze phenomenon, and in a case of being used for a plasma display panel or the like, the contrast is largely reduced due to the occurrence of the blue haze phenomenon, thereby causing concern about a generation of a problem of losing vividness and ease of viewing.

Further, the applicant discloses in patent document 5 a near-infrared shielding fine particle dispersion liquid and a near-infrared shielding dispersion body, or the like, with the blue haze phenomenon suppressed, by charging a slurry obtained by mixing the composite tungsten oxide powder produced by the same method as the producing method disclosed in patent document 4, a solvent, and a dispersant into a medium stirring mill together with yttria-stabilized zirconia beads, which is then subjected to pulverization and dispersion treatment until a predetermined particle size is obtained.

However, the composite tungsten oxide produced in patent document 5 has a large particle size of 1 to 5 μm. Accordingly, in order to obtain a near-infrared shielding fine particle dispersion liquid capable of suppressing the blue haze phenomenon, it is necessary to pulverize the composite tungsten oxide for a long time by using a medium stirring mill to finely pulverize the particles. Such a long pulverization process significantly lowers productivity of the near-infrared ray shielding fine particle dispersion liquid.

Therefore, the applicant discloses in patent document 6 the composite tungsten oxide ultrafine particles having a particle size of 100 nm or less produced using a plasma reaction. As a result, by using the composite tungsten oxide ultrafine particles having a small particle size initially as a raw material, there is no necessity for performing a long pulverization treatment, thus making it possible to produce the near-infrared shielding fine particle dispersion liquid with high productivity.

On the other hand, there is also disclosed in patent document 7 a method for producing composite tungsten oxide fine particles using a plasma reaction.

PRIOR ART DOCUMENT

Patent Document

[Patent Document 1] Japanese Unexamined Patent Publication No. 2-136230
[Patent Document 2] Japanese Unexamined Patent Publication No. 8-259279
[Patent Document 3] Japanese Unexamined Patent Application Publication No. 11-181336
[Patent Document 4] International Publication No. WO 2005/037932
[Patent Document 5] Japanese Unexamined Patent Application Publication No. 2009-215487
[Patent Document 6] Japanese Unexamined Patent Publication No. 2010-265144
[Patent Document 7] Published Japanese Translation No. 2012-506463

SUMMARY OF THE INVENTION

Problem to be Solved by the Invention

However, according to further study by the applicant, the composite tungsten oxide ultrafine particles produced by the method disclosed in patent document 6 have low crystallinity, and therefore the near-infrared shielding properties of the dispersion liquid in which the composite tungsten oxide ultrafine particles are used, are not satisfactory.

Further, the composite tungsten oxide fine particles produced by using the plasma reaction described in patent document 7, contain binary tungsten oxide (namely, phase consisting essentially of elements W and O) and tungsten metal, other than the composite tungsten oxide fine particles. Therefore, the near-infrared shielding properties are not satisfactory.

Under such a circumstance, the present invention is provided, and an object of the present invention is to provide general-purpose composite tungsten oxide ultrafine particles capable of producing a dispersion liquid with high productivity while having excellent near-infrared shielding properties and transparency in a visible light region due to having high crystallinity, and a composite tungsten oxide ultrafine particle dispersion liquid using the same.

Means for Solving the Problem

The inventors of the present invention conducted extensive research to achieve the above-described object.

Then, the present inventors found the composite tungsten oxide ultrafine particles having a predetermined value of a peak top intensity ratio in the X-ray diffraction (sometimes referred to as "XRD" hereafter in the present invention) pattern of the composite tungsten oxide ultrafine particles. Specifically, the present inventors found the composite tungsten oxide ultrafine particles having the value of the XRD peak top intensity ratio of 0.13 or more when the value of the XRD peak intensity ratio was set to 1, with plane (220) of a silicon powder standard sample (640c produced by NIST) as a reference.

This composite tungsten oxide ultrafine particles are general-purpose composite tungsten oxide ultrafine particles capable of producing a dispersion liquid with high productivity while having transparency in a visible light region and having excellent near-infrared shielding properties.

Further, it is also found that the blue haze phenomenon can be suppressed if the dispersed particle size of each composite tungsten oxide ultrafine particles is 200 nm or less in the dispersion liquid in which the composite tungsten oxide ultrafine particles are used, thus completing the present invention.

Namely, in order to solve the above-described problem, a first invention is composite tungsten oxide ultrafine particles having near-infrared shielding properties, wherein a value of an XRD peak top intensity ratio of the composite tungsten oxide ultrafine particles is 0.13 or more when the XRD peak intensity is set to 1, with plane (220) of a silicon powder standard sample (640 c produced by NIST) as a reference.

A second invention is the composite tungsten oxide ultrafine particles of the first invention, expressed by a general formula $M_xW_yO_z$ (wherein M element is an element of one or more kinds selected from H, He, alkali metal, alkaline earth metal, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, and Yb, W is tungsten, O is oxygen, satisfying $0.001 \le x/y \le 1$, $2.2 \le z/y \le 3.0$.)

A third invention is the composite tungsten oxide ultrafine particles of the first or second invention, wherein a crystallite size of each composite tungsten oxide ultrafine particle is 1 nm or more.

A fourth invention is the composite tungsten oxide ultrafine particles of any one of the first to third inventions, wherein the composite tungsten oxide ultrafine particle contains a hexagonal crystal structure.

A fifth invention is the composite tungsten oxide ultrafine particles of any one of the first to fourth inventions, wherein a content of a volatile component in the composite tungsten oxide ultrafine particles is 2.5 mass % or less.

A sixth invention is a composite tungsten oxide ultrafine particle dispersion liquid, in which the composite tungsten oxide ultrafine particles of any one of the first to fifth inventions are contained in a dispersed state in a liquid medium, the liquid medium being one or more kinds selected from water, an organic solvent, a fat or oil, a liquid resin, a liquid plasticizer, a polymeric monomer, or a mixture thereof.

A seventh invention is the composite tungsten oxide ultrafine particle dispersion liquid of the sixth invention, wherein each composite tungsten oxide ultrafine particle contained in the composite tungsten oxide ultrafine particle dispersion liquid has a dispersed particle size of 1 nm or more and 200 nm or less.

An eighth invention is the composite tungsten oxide ultrafine particle dispersion liquid of the sixth or seventh invention, wherein a content of the composite tungsten oxide ultrafine particles contained in the composite tungsten oxide ultrafine particle dispersion liquid is 0.01 mass % or more and 80 mass % or less.

ADVANTAGE OF THE INVENTION

By using the composite tungsten oxide ultrafine particles of the present invention, it is possible to produce a general-purpose near-infrared shielding dispersion liquid having transparency in a visible light region and having excellent near-infrared shielding properties.

DETAILED DESCRIPTION OF THE INVENTION

Figure 1:
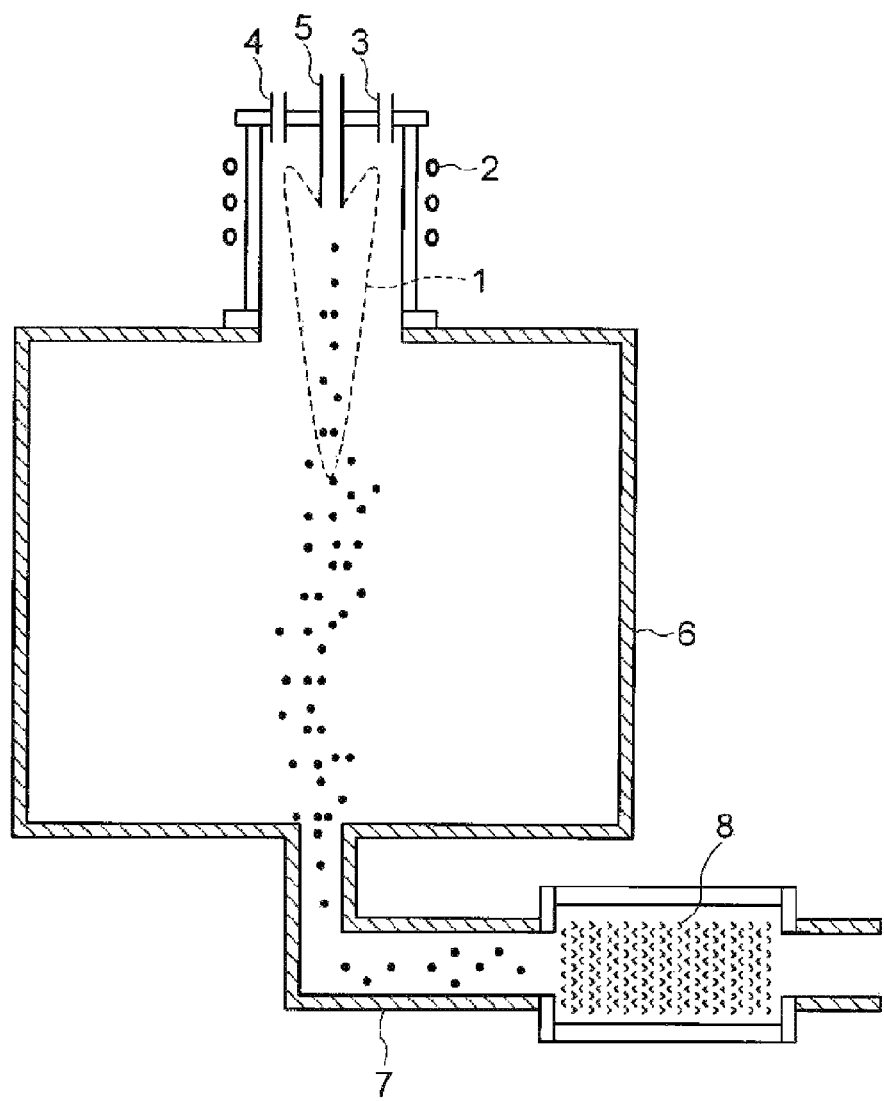
FIG. 1 is a conceptual diagram of a high-frequency plasma reaction device used in the present invention.

Embodiments of the present invention will be described hereafter in an order of [a] Composite tungsten oxide ultrafine particles, [b] Method for synthesizing the composite tungsten oxide ultrafine particles, [c] Volatile component of the composite tungsten oxide ultrafine particles and its drying treatment method, and [d] Composite tungsten oxide ultrafine particle dispersion liquid.

[a] Composite Tungsten Oxide Ultrafine Particles

The composite tungsten oxide ultrafine particles of the present invention have near-infrared shielding properties, in which a value of the XRD peak top intensity ratio is 0.13 or more when a value of an XRD peak intensity ratio is set to 1, with plane (220) of a silicon powder standard sample (640 c produced by NIST) as a reference.

The composite tungsten oxide ultrafine particles of the present invention will be described sequentially in an order of (1) XRD peak top intensity ratio, (2) Composition, (3) Crystal structure, (4) BET specific surface area, (5) Dispersed particle size, (6) Volatile component, and (7) Summary.

(1) XRD Peak Top Intensity Ratio

For measuring the XRD peak top intensity of the above-described composite tungsten oxide ultrafine particles, a powder X-ray diffraction method is used. At this time, to make measurement results objectively quantitative among samples of the composite tungsten oxide ultrafine particles, a standard sample is defined, and the peak intensity of the standard sample is measured, the value of the XRD peak top intensity ratio of the ultrafine particle sample to the peak intensity of the standard sample is expressed as the XRD peak top intensity of each ultrafine particle sample.

Here, as the standard sample, a silicon powder standard sample (NIST, 640 c) having universality in this industry is used, and plane (220) in the silicon powder standard sample not overlapping with the XRD peak of the composite tungsten oxide ultrafine particles is taken as a reference.

Further, in order to ensure objective quantification, other measurement conditions are always set to be constant.

Specifically, a sample holder with a depth of 1.0 mm is filled with the ultrafine particle sample by a known operation in X-ray diffraction measurement. Specifically, in order to avoid a preferential orientation (crystal orientation) in the ultrafine particle sample, it is preferable to fill it randomly and gradually, and fill it as densely as possible without unevenness.

As an X-ray source, an X-ray tube having Cu as an anode target material is used in an output setting of 45 kV/40 mA, and measurement is performed by powder X-ray diffraction method of $\theta$-$2\theta$ in step scan mode (step size: 0.0165° ($2\theta$) and counting time: 0.022 msec/step).

At this time, the XRD peak intensity is varied according to the use time of the X-ray tube, and therefore it is preferable that the use time of the X-ray tube is almost the same among samples. In order to ensure objective quantification, it is necessary that a difference between the samples during the use time of the X-ray tube be at most 1/20 or less of a predicted lifetime of the X-ray tube. As a more preferable measurement method, there is a method for calculating the XRD peak intensity ratio by performing measurement of the silicon powder standard sample every time the X-ray diffraction pattern of the composite tungsten oxide ultrafine particles is measured. Such a measurement method is used in the present invention. The X-ray tube predicted lifetime of a commercially available X-ray device is mostly several thousand hours or more and the measurement time per sample is several hours or less, and therefore by performing the above-described preferable measurement method, an influence on the XRD peak top intensity ratio due to the use time of the X-ray tube can be made negligibly small.

Further, in order to keep the temperature of the X-ray tube constant, it is preferable to keep a cooling water temperature for the X-ray tube constant.

The X-ray diffraction pattern of the composite tungsten oxide ultrafine particles is the X-ray diffraction pattern of a plurality of composite tungsten oxide ultrafine particles constituting a powder sample of the composite tungsten oxide, which is the X-ray diffraction pattern of the composite tungsten oxide ultrafine particles after being disintegrated, pulverized or dispersed described later, in order to obtain the composite tungsten oxide ultrafine particle dispersion liquid. Then, the X-ray diffraction pattern of the composite tungsten oxide ultrafine particles and the composite tungsten oxide ultrafine particles contained in the composite tungsten oxide ultrafine particle dispersion liquid according to the present invention, is also maintained in the X-ray diffraction pattern of the composite tungsten oxide ultrafine particle dispersion body of the present invention.

Note that the XRD peak top intensity is the peak intensity at $2\theta$ where the peak count is highest in the X-ray diffraction pattern. Then, in hexagonal Cs composite tungsten oxide and Rb composite tungsten oxide, the peak count $2\theta$ in the X-ray diffraction pattern appears in a range of 25° to 31°.

The XRD peak top intensity of the composite tungsten oxide ultrafine particles is closely related to the crystallinity of the ultrafine particles, and further it is closely related to a free electron density in the ultrafine particles. It is found by the present inventors that the XRD peak top intensity greatly affects the near-infrared shielding properties of the composite tungsten oxide ultrafine particles. Specifically, it is found that when the value of the XRD peak top intensity ratio is 0.13 or more, a free electron density in the ultrafine particles is ensured and desired near-infrared shielding properties can be obtained. Note that the value of the XRD peak top intensity ratio may be 0.13 or more, and preferably 0.7 or less.

The XRD peak top intensity of the composite tungsten oxide ultrafine particles will also be described from a different viewpoint.

When the value of the XRD peak top intensity ratio of the composite tungsten oxide ultrafine particle is 0.13 or more, this means that the composite tungsten oxide ultrafine particles with good crystallinity containing almost no hetero phase are obtained. Namely, it is considered that the obtained composite tungsten oxide ultrafine particles are not amorphous (amorphous). As a result, it is considered that by dispersing the composite tungsten oxide ultrafine particles containing almost no such hetero phase in a liquid medium such as an organic solvent that transmits visible light, or a solid medium such as resin that transmits visible light, the near-infrared shielding properties are sufficiently obtained.

In the present invention, "hetero phase" means a phase of a compound other than the composite tungsten oxide. Further, by analyzing the X-ray diffraction pattern obtained when measuring the XRD peak top intensity, the crystal structure and the crystallite size of each composite tungsten oxide fine particle can be obtained.

(2) Composition

Then, the composite tungsten oxide ultrafine particles of the present invention are preferably the composite tungsten oxide ultrafine particles expressed by a general formula $M_xW_yO_z$ (wherein M element is an element of one or more kinds selected from H, He, alkali metal, alkaline earth metal, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, satisfying $0.001 \leq x/y \leq 1$, $2.0 \leq z/y \leq 3.0$.)

The composite tungsten oxide ultrafine particles expressed by the general formula $M_xW_yO_z$ will be described.

The M element, x, y, z and a crystal structure thereof in the general formula $M_xW_yO_z$, are closely related to the free electron density of the composite tungsten oxide ultrafine particles, and greatly affect the infrared shielding properties.

Generally, there is no effective free electron in tungsten trioxide ($WO_3$), and therefore the near-infrared shielding properties are low.

Here, it is found by the present inventors that by obtaining the composite tungsten oxide by adding an element of one or more kinds selected from M element (wherein M element is an element of one or more kinds selected from H, He, alkali metal, alkaline earth metal, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, and Yb) to the tungsten oxide, free electrons are generated in the composite tungsten oxide, shielding properties derived from the free electrons are developed in the near-infrared region. Then the composite tungsten oxide becomes effective as a near-infrared shielding material in the vicinity of a wavelength of 1000 nm, and is maintained in a chemically stable state, and becomes effective as a near-infrared shielding material excellent in weather resistance. Further, M element is preferably Cs, Rb, K, Tl, Ba, Cu, Al, Mn, and In. Among them, when the M element is Cs or Rb, the composite tungsten oxide can easily take a hexagonal crystal structure. As a result, since the composite tungsten oxide transmits visible light and absorbs and shields near-infrared rays, it is also found to be particularly preferable for the reason described later.

Here, the knowledge of the present inventors on the value of x indicating an addition amount of the M element will be described.

When the value of x/y is 0.001 or more, a sufficient amount of free electrons is generated and a desired near-infrared shielding property can be obtained. Then, as the addition amount of the M element is increased, a feed amount of the free electrons is increased and the near-infrared shielding property is also increased, but when the value of x/y is 1 or less, the effect is saturated. Further, when the value of x/y is about 1, generation of an impurity phase in the composite tungsten ultrafine particles can be avoided, which is preferable.

Next, the knowledge of the present inventors on the value of z indicating control of oxygen content will be described.

In the composite tungsten oxide ultrafine particle expressed by the general formula $M_xW_yO_z$, the value of z/y is preferably $2.0 < z/y \leq 3.0$, more preferably, $2.2 \leq z/y \leq 3.0$, further more preferably $2.6 \leq z/y \leq 3.0$, and most preferably $2.7 \leq z/y \leq 3.0$. This is because when the value of z/y is 2.0 or more, it is possible to avoid an appearance of a crystal phase of $WO_2$ which is not desired in the composite tungsten oxide, and chemical stability as a material can be obtained, and therefore it is possible to be applied as an effective infrared shielding material. In contrast, when the value of z/y is 3.0 or less, a required amount of free electrons is generated in the tungsten oxide and it is possible to be used as an efficient infrared shielding material.

(3) Crystal Structure

The composite tungsten oxide ultrafine particles take a tetragonal or cubic tungsten bronze structure other than the hexagonal crystal structure. Therefore, it is effective as a near-infrared shielding material even when adopting any crystal structure. However, a shielding position in the near-infrared region is likely to change depending on the crystal structure taken by the composite tungsten oxide ultrafine particles. Namely, the shielding position in the near-infrared region is shifted to a longer wavelength side in a case of the tetragonal crystal structure than the cubic crystal structure, and the shielding position is likely to be shifted to a further longer wavelength side in a case of the hexagonal crystal structure than the tetragonal crystal structure. Further, in conjunction with a fluctuation of the shielding position, shielding in the visible light region is smallest in an order of the hexagonal crystal structure, the tetragonal crystal structure, and the cubic crystal structure in which shielding is largest among them.

From the above-described knowledge, for applications in which light in the visible light region is more transmitted and light in the near-infrared region is more shielded, it is most preferable to use the hexagonal tungsten bronze. When each composite tungsten oxide ultrafine particles has a hexagonal crystal structure, transmittance of the fine particles in the visible light region is improved and shielding in the near-infrared region is improved.

Namely, in the composite tungsten oxide, when the value of the XRD peak top intensity ratio satisfies a predetermined value and in a case of the hexagonal tungsten bronze, excellent optical properties are exhibited. Further, even when each composite tungsten oxide ultrafine particle has an orthorhombic crystal structure or a monoclinic crystal structure similar to $WO_{2.72}$ called the Magneli phase, it is excellent in infrared absorption, and it is effective as a near-infrared shielding material in some cases.

From the above-described knowledge, when the composite tungsten oxide ultrafine particle having a hexagonal crystal structure has a uniform crystal structure, the addition amount of the M element is expressed by the value of x/y which is preferably 0.2 or more and 0.5 or less, and is more preferably $0.29 \leq x/y \leq 0.39$. Theoretically, when satisfying z/y=3, the value of x/y is 0.33. Thereby, it is considered that added M elements are arranged in all hexagonal voids.

Further, in the composite tungsten oxide ultrafine particles, it is preferable to be a single crystal having 50% or more volume ratio, or in other words, it is preferable to be a single crystal having less than 50% volume ratio of an amorphous phase.

When the composite tungsten oxide ultrafine particle is a single crystal having less than 50% volume ratio of the amorphous phase, it is possible to set the crystallite size to 200 nm or less while maintaining the XRD peak top intensity. By setting the crystallite size of the composite tungsten oxide ultrafine particles to 200 nm or less, a dispersed particle size thereof can be set to 1 nm or more and 200 nm or less.

In contrast, although the dispersed particle size is 1 nm or more and 200 nm or less in the composite tungsten ultrafine particles, in a case that the amorphous phase is present in a volume ratio of more than 50% or in a case of polycrystal, the value of the XRD peak top intensity ratio of the composite tungsten ultrafine particle is less than 0.13, and as a result, the near-infrared ray absorbing properties are insufficient and the near-infrared shielding properties are insufficient in some cases.

Then, it is more preferable that the crystallite size of the composite tungsten oxide ultrafine particle is 200 nm or less and 10 nm or more. This is because when the crystallite size is in a range of 200 nm or less and 10 nm or more, the value of the XRD peak top intensity ratio exceeds 0.13, and further excellent infrared shielding properties are exhibited.

Note that the X-ray diffraction pattern of the composite tungsten oxide ultrafine particles in the composite tungsten oxide ultrafine particle dispersion liquid after being disintegrated, pulverized or dispersed described later, is maintained in the X-ray diffraction pattern of the composite tungsten oxide ultrafine particles obtained by removing the volatile component in the composite tungsten oxide ultrafine particle dispersion liquid of the present invention, and in the X-ray diffraction pattern of the composite tungsten oxide ultrafine particles contained in the dispersion body obtained from the dispersion liquid.

As a result, the effect of the present invention is exhibited as long as a crystal state such as the XRD pattern, the XRD peak top intensity, and the crystallite size of the composite tungsten oxide ultrafine particle in the composite tungsten oxide ultrafine particle dispersion body obtained from the composite tungsten oxide ultrafine particle dispersion liquid, is in a crystal state of the composite tungsten oxide ultrafine particles that can be used in the present invention.

Note that it is possible to confirm that the composite tungsten oxide ultrafine particles are single crystals, because grain boundaries are not observed in each fine particle, but only uniform lattice fringes are observed in an electron microscope image obtained by a transmission electron microscope or the like. It is also confirmed that the volume ratio of the amorphous phase is less than 50% in the composite tungsten oxide ultrafine particles, because uniform lattice stripes are observed throughout the particle, and almost no places of unclear lattice stripes are observed similarly in the transmission electron microscope image. The amorphous phase is present in an outer circumferential part of the particle in many cases, and therefore by paying attention to the outer circumferential part of the particle, the volume ratio of the amorphous phase can be calculated in many cases. For example, when the amorphous phase whose lattice stripes are unclear is present in a layered manner on the particle outer circumferential part of a spherical composite tungsten oxide ultrafine particle, and when a thickness of the layer is 20% or less of the particle size of the composite tungsten oxide ultrafine particle, the volume ratio of the amorphous phase in the composite tungsten oxide ultrafine particles is less than 50%.

On the other hand, when the composite tungsten oxide ultrafine particles are dispersed in a coating layer constituting the composite tungsten oxide ultrafine particle dispersion body, or in a layer obtained by applying a predetermined treatment to the coating layer to cure the resin of the coating layer (Sometimes referred to as "a cured layer" in the present invention), and when a value of a difference obtained by subtracting the crystallite size from an average particle size of the dispersed composite tungsten oxide ultrafine particles is 20% or less of the average particle size, it can be said that the composite tungsten oxide ultrafine particle is a single crystal in which the volume ratio of an amorphous phase is less than 50%.

Here, the average particle size of the composite tungsten oxide ultrafine particles can be obtained by measuring the particle size of 100 composite tungsten oxide ultrafine particles using an image processing device, from a transmission electron microscopic image of the composite tungsten oxide ultrafine particle dispersion body, and calculating the average value thereof. Then, a synthesis step, a pulverization step and a dispersion step of the composite tungsten oxide ultrafine particles may be appropriately adjusted according to a production facility, so that a difference between the average particle size and the crystallite size of the composite tungsten oxide ultrafine particles dispersed in the composite tungsten oxide ultrafine particle dispersion body is 20% or less.

(4) BET Specific Surface Area

The BET specific surface area of the above-described composite tungsten oxide ultrafine particles is, closely related to the particle size distribution of the ultrafine particles, but simultaneously greatly affects productivity of near-infrared shielding dispersion liquid using the ultrafine particles as a raw material, and infrared shielding properties of the ultrafine particles themselves and light resistance to suppress light coloring.

A small BET specific surface area of the ultrafine particles indicates that the crystallite size of each ultrafine particle is large. Therefore, when the BET specific surface area of the ultrafine particle is not less than a predetermined value, it is not necessary to pulverize the ultrafine particles by a medium stirring mill for a long time to make finer particles in order to produce the near-infrared shielding dispersion liquid having transparency in the visible light region and capable of suppressing the above-described blue haze phenomenon, and improvement of the productivity of the near infrared shielding dispersion liquid can be realized.

On the other hand, the fact that the BET specific surface area of the ultrafine particle is a predetermined value or less, for example, 200 $m^2/g$ or less, indicates that the BET particle size becomes 2 nm or more when assuming that a particle shape is a true spherical shape, and means that there are almost no ultrafine particles having a crystallite size of 1 nm or less which do not contribute to the near infrared shielding property. Therefore, when the BET specific surface area of the ultrafine particles is not more than a predetermined value, near-infrared shielding properties and light resistance of the ultrafine particles are ensured.

However, in addition to the fact that the BET specific surface area of the ultrafine particles is 200 m²/g or less, when the above-described value of the XRD peak top intensity is a predetermined value or more, there are almost no ultrafine particles having a crystallite size of 1 nm or less which do not contribute to the near infrared shielding properties, and ultrafine particles with good crystallinity are present, and therefore it can be considered that the near-infrared shielding properties and the light resistance of the ultrafine particles are ensured.

For the measurement of the BET specific surface area of the composite tungsten oxide ultrafine particles described above, nitrogen gas, argon gas, krypton gas, xenon gas and the like are used as the gas used for adsorption. However, when a measurement sample is powder and a specific surface area is 0.1 m²/g or more like the composite tungsten oxide ultrafine particles of the present invention, it is preferable to use nitrogen gas which is comparatively easy to handle and low cost. The BET specific surface area of the composite tungsten oxide ultrafine particles is preferably 30.0 m²/g or more and 120.0 m²/g or less, more preferably 30.0 m²/g or more and 90.0 m²/g or less, further more preferably 35.0 m²/g or more and 70.0 m²/g or less. It is preferable that the BET specific surface area of the composite tungsten oxide ultrafine particles is the above-described value even before and after pulverization and dispersion for obtaining the composite tungsten oxide ultrafine particle dispersion liquid.

(5) Dispersed Particle Size

The dispersed particle size of each composite tungsten oxide ultrafine particles is preferably 200 nm or less, and more preferably the dispersed particle size is 200 nm or less and 10 nm or more. It is preferable that the dispersed particle size of the composite tungsten oxide ultrafine particles is 200 nm or less, and the same is true for the composite tungsten oxide ultrafine particles in the composite tungsten oxide ultrafine particle dispersion liquid, because it is preferable that the crystallite size of each composite tungsten oxide ultrafine particle is 200 nm or less at largest. On the other hand, from a viewpoint of the near-infrared absorption properties of the composite tungsten oxide ultrafine particles, the crystal particle size is preferably 1 nm or more, and more preferably 10 nm or more.

(6) Volatile Component

The above-described composite tungsten oxide ultrafine particles contain a component volatilized by heating (sometimes described as "volatile component" in the present invention) in some cases. The volatile component is a component that is adsorbed when the composite tungsten oxide ultrafine particle is exposed to a storage atmosphere or the air atmosphere or during a synthesis process. Here, specific examples of the volatile component include a case of water, or a case of the solvent of the dispersion liquid described later, and for example, the volatile component is a component that volatilizes from the composite tungsten oxide ultrafine particles by heating at 150° C. or less.

The volatile component and its content in the composite tungsten oxide ultrafine particles are related to an amount of moisture adsorbed when the ultrafine particles are exposed to the atmosphere or the like and a residual amount of the solvent in the drying step of the ultrafine particles. Then, the volatile component and its content may greatly affect dispersibility in some cases, when the ultrafine particles are dispersed in the resin or the like.

For example, when compatibility is poor between the resin used for a near infrared absorbing dispersion body described later and the volatile component adsorbed on the ultrafine particle, and further when the content of the volatile component is large in the ultrafine particle, there is a possibility of causing haze generation (deterioration of transparency) of the produced near infrared absorbing dispersion body. Further, when the produced near-infrared absorbing dispersion body is installed outdoors for a long time and exposed to sunlight or weather, there is a possibility that the composite tungsten oxide ultrafine particles are desorbed from the near-infrared absorbing dispersion body or peeling of the film occurs. Namely, the poor compatibility between the ultrafine particles and the resin causes deterioration of the produced near-infrared absorbing dispersion body. This means that in the composite tungsten oxide ultrafine particles containing a large amount of volatile components, whether or not there is a satisfactory dispersion of the ultrafine particles may be affected by the compatibility with a dispersion medium used in a dispersion system. Accordingly, in the composite tungsten oxide ultrafine particles of the present invention, when the content of the volatile component is not more than the predetermined amount, versatility is exhibited.

According to the study by the present inventors, it is found that when the content of the volatile component is 2.5 mass % or less in the composite tungsten oxide ultrafine particles, the ultrafine particles can be dispersed in a dispersion medium used for any one of the dispersion systems, and such composite tungsten oxide ultrafine particles become the general-purpose composite tungsten oxide ultrafine particles.

On the other hand, it is also found that a lower limit of a content ratio of the volatile component is not particularly limited.

As a result, when the ultrafine particles having the volatile component content of 2.5 mass % or less are not excessively secondary aggregated, the ultrafine particles can be dispersed in resin or the like, using a method of uniformly mixing (including melt mixing) by a mixing machine such as a tumbler, a Nauta mixer, a Henschel mixer, a super mixer, a planetary mixer, and a kneading machine such as a Banbury mixer, a kneader, a roll, a single screw extruder, and a twin screw extruder.

The content of the volatile component in the composite tungsten oxide ultrafine particles can be measured by thermal analysis. Specifically, a weight reduction of a composite tungsten oxide ultrafine particle sample may be measured by holding the composite tungsten oxide ultrafine particle sample at a temperature lower than a temperature at which the composite tungsten oxide ultrafine particle is thermally decomposed and higher than a temperature at which the volatile component is volatilized. Further, when the volatile component is specified, gas mass spectrometry may be used together.

(7) Conclusion

As described above, the value of the XRD peak top intensity and the BET specific surface area of the composite tungsten oxide ultrafine particles can be controlled by predetermined production conditions, and specifically can be controlled by a suitable setting of the production conditions such as a temperature (firing temperature), a generation time (firing time), a generation atmosphere (firing atmosphere), a form of a precursor raw material, an annealing treatment after generation, doping of an impurity element, and the like, for producing the ultrafine particles by the thermal plasma method or the solid-phase reaction method. On the other hand, the content of the volatile component of the composite tungsten oxide ultrafine particles can be controlled by a suitable setting of the production conditions such as a preservation method and a storage atmosphere of the ultrafine particles, a temperature at which the ultrafine particles dispersion liquid is dried, a drying time, and a drying method, and the like. Note that the content of the volatile component of the composite tungsten oxide ultrafine particles does not depend on the crystal structure of the composite tungsten oxide ultrafine particles or the synthesis method such as the thermal plasma method or the solid-phase reaction method described later.

[b] Method for Synthesizing the Composite Tungsten Oxide Ultrafine Particles

A method for synthesizing the composite tungsten oxide ultrafine particles of the present invention will be described.

The method for synthesizing the composite tungsten oxide ultrafine particles of the present invention, includes the thermal plasma method for charging a tungsten compound starting material into a thermal plasma, and the solid-phase reaction method for performing heat treatment to the tungsten compound starting material in a reducing gas atmosphere. The composite tungsten oxide fine particles synthesized by the thermal plasma method or the solid-phase reaction method are subjected to dispersion treatment or pulverization and dispersion treatment.

Explanation will be given hereafter in the order of (1) Thermal plasma method, (2) Solid-phase reaction method, and (3) Synthesized composite tungsten oxide ultrafine particles.

(1) Thermal Plasma Method

Explanation will be given for the thermal plasma method in the order of (i) Raw material used for the thermal plasma method, (ii) Thermal plasma method and its conditions.

(i) Raw Material Used for the Thermal Plasma Method

When synthesizing the composite tungsten oxide ultrafine particles of the present invention by the thermal plasma method, a mixed powder of the tungsten compound and the M element compound can be used as a raw material.

The tungsten compound is preferably one or more kinds selected from tungstic acid ($H_2WO_4$), ammonium tungstate, tungsten hexachloride, and tungsten hydrate obtained by adding water to the tungsten hexachloride which is dissolved in alcohol and hydrolyzed, and then evaporating the solvent.

Further, as the M element compound, it is preferable to use at least one element selected from oxides, hydroxides, nitrates, sulfates, chlorides and carbonates of M element.

The above-described tungsten compound and the above-described aqueous solution containing M element compound, are wet-mixed so that the ratio of the M element to the W element is $M_xW_yO_z$ (wherein M is the M element, W is tungsten, O is oxygen, satisfying $0.001 \leq x/y \leq 1.0$, $2.0 < z/y \leq 3.0$). Then, by drying the obtained mixture liquid, a mixed powder of the M element compound and the tungsten compound is obtained. Then, the mixed powder can be used as a raw material for the thermal plasma method.

Further, the composite tungsten oxide obtained by first firing of the mixed powder in an inert gas alone or in a mixed gas atmosphere of the inert gas and a reducing gas, can also be used as a raw material for the thermal plasma method. Besides, the composite tungsten oxide obtained by two stage firing such as first firing of the mixed powder in the mixed gas atmosphere of the inert gas and the reducing gas, and a second firing of the first fired material in the inert gas atmosphere, can also be used as the raw material for the thermal plasma method.

(ii) Thermal Plasma Method and its Conditions

As the thermal plasma used in the present invention, for example, any one of DC arc plasma, high-frequency plasma, microwave plasma, low frequency alternating current plasma, or superimposed plasma of them, or plasma generated by an electric method of applying a magnetic field to direct current plasma, plasma generated by irradiation of a large output laser, and plasma generated by high power electron beam or ion beam, can be used. However, regardless of which thermal plasma is used, it is preferable to use thermal plasma having a high temperature part of 10000 to 15000 K, and particularly to use plasma capable of controlling the time for generating the ultrafine particles.

The raw material fed into the thermal plasma having the high temperature part is evaporated instantaneously in the high temperature part. Then, the evaporated raw material is condensed in the course of reaching a plasma tail flame part, and is rapidly solidified outside of the plasma flame, thereby producing the composite tungsten oxide ultrafine particles.

A synthesis method will be described with reference to FIG. 1 taking as an example a case of using a high-frequency plasma reaction device.

First, an inside of a reaction system constituted by an inside of a water-cooled quartz double tube and an inside of a reaction vessel 6 is evacuated to about 0.1 Pa (about 0.001 Torr) by a vacuum exhaust device. After evacuating the inside of the reaction system, this time the inside of the reaction system is filled with argon gas to make an argon gas flow system of 1 atm.

Thereafter, any gas selected from argon gas, mixed gas of argon and helium (Ar—He mixed gas), mixed gas of argon and nitrogen (Ar—$N_2$ mixed gas) is introduced into the reaction vessel as a plasma gas at a flow rate of 30 to 45 L/min. On the other hand, Ar—He mixed gas is introduced at a flow rate of 60 to 70 L/min, as the sheath gas to be flowed to immediately outside of the plasma region.

Then, an alternating current is applied to the high-frequency coil 2 to generate thermal plasma by a high-frequency electromagnetic field (frequency 4 MHz). At this time, plate power is set to 30 to 40 kW.

Further, the mixed powder of the M element compound and the tungsten compound obtained by the above-described synthesis method, or the composite tungsten oxide are introduced from the powder feeding nozzle 5 into the thermal plasma at a feed rate of 25 to 50 g/min, using the argon gas of 6 to 98 L/min fed from a gas feeding device as a carrier gas, and a reaction is caused for a predetermined time. After the reaction, the generated composite tungsten oxide ultrafine particles are deposited on a filter 8, and therefore the deposited particles are recovered.

The carrier gas flow rate and the raw material feed rate greatly affect the generation time of the ultrafine particles. Therefore, it is preferable that the carrier gas flow rate is set to 6 L/min or more and 9 L/min or less and the raw material feed rate is set to 25 to 50 g/min.

Further, the plasma gas flow rate is preferably 30 L/min or more and 45 L/min or less, and a sheath gas flow rate is preferably 60 L/min or more and 70 L/min or less. The plasma gas has a function of keeping a thermal plasma region having a high temperature part of 10000 to 15000 K, and the sheath gas has a function of cooling an inner wall surface of a quartz torch in the reaction vessel and preventing melting of the quartz torch. At the same time, the plasma gas and the sheath gas affect the shape of the plasma region, and therefore these gas flow rates are important parameters for shape control of the plasma region. As the plasma gas flow rate and the sheath gas flow rate are increased, the shape of the plasma region extends in a gas flow direction, and a temperature gradient of the plasma tail flame part becomes gentle, and therefore it becomes possible to lengthen the generation time of the ultrafine particles to be produced and to produce the ultrafine particles with good crystallinity. Thereby, the value of the XRD peak top intensity ratio of the composite tungsten oxide ultrafine particles of the present invention can be set to a desired value. On the contrary, as the plasma gas flow rate and the sheath gas flow rate are decreased, the shape of the plasma region shrinks in the gas flow direction, and the temperature gradient of the plasma tail flame part becomes steep, and therefore it becomes possible to shorten the generation time of the ultrafine particles to be produced and to form the ultrafine particles having a large BET specific surface area. As a result, the value of the XRD peak top intensity ratio of the composite tungsten oxide ultrafine particles of the present invention can be set to a predetermined value.

When the composite tungsten oxide obtained by synthesis using the thermal plasma method has a crystallite size exceeding 200 nm, or when the dispersed particle size of the composite tungsten oxide in the composite tungsten oxide ultrafine particle dispersion liquid obtained from the composite tungsten oxide obtained by the thermal plasma method exceeds 200 nm, the pulverization and dispersion treatment described later can be performed. When the composite tungsten oxide is synthesized by the thermal plasma method, the effect of the present invention is exhibited by appropriately selecting the conditions for the pulverization and dispersion treatment thereafter and setting the value of the XRD peak top intensity ratio to 0.13 or more, thereby suppressing the difference between the average particle size and the crystallite size of the composite tungsten oxide ultrafine particles to 20% or less in the composite tungsten oxide ultrafine particle dispersion body of the coating layer coating the composite tungsten oxide ultrafine particle dispersion liquid.

(2) Solid-phase Reaction Method

The solid-phase reaction method will be described in an order of (i) Raw material used in the solid-phase reaction method, and (ii) Firing in the solid-phase reaction method and its conditions.

(i) Raw Material Used in the Solid-phase Reaction Method

When synthesizing the composite tungsten oxide ultrafine particles of the present invention by the solid-phase reaction method, a tungsten compound and an M element compound are used as the raw material.

The tungsten compound is preferably one or more kinds selected from tungstic acid ($H_2WO_4$), ammonium tungstate, tungsten hexachloride, and tungsten hydrate obtained by adding water to the tungsten hexachloride which is dissolved in alcohol and hydrolyzed, and then evaporating the solvent.

Further, the element M compound used for producing the raw material of the composite tungsten oxide ultrafine particles expressed by the general formula $M_xW_yO_z$ (wherein M is an element of one or more kinds selected from Cs, Rb, K, Tl, Ba, satisfying $0.001 \leq x/y \leq 1$, $2.0 < z/y\ 3.0$) which is a more preferable embodiment, is preferably one or more kinds selected from oxides, hydroxides, nitrates, sulfates, chlorides, carbonates of element M.

Further, a compound containing an impurity element of one or more kinds selected from Si, Al, and Zr (sometimes referred to as "impurity element compound" in the present invention) may be contained as a raw material. The impurity element compound does not react with the composite tungsten compound in a subsequent firing step, and works to suppress a crystal growth of the composite tungsten oxide and prevent coarsening of the crystal. The compound containing the impurity element is preferably one or more kinds selected from oxides, hydroxides, nitrates, sulfates, chlorides, carbonates, and colloidal silica and colloidal alumina having a particle size of 500 nm or less are particularly preferable.

The above-described tungsten compound and the aqueous solution containing the M element compound are wet-mixed in such a manner that the ratio of the M element to the W element is $M_xW_yO_z$ (M is the M element, W is tungsten, O is oxygen, satisfying $0.001 \leq x/y\ 1.0$, $2.0 < z/y \leq 3.0$). When the impurity element compound is contained as a raw material, the impurity element compound is wet-mixed so as to be 0.5 mass % or less. Then, by drying the obtained mixed solution, the mixed powder of the M element compound and the tungsten compound, or the mixed powder of the M element compound containing the impurity element compound and the tungsten compound can be obtained.

(ii) Firing in the Solid-Phase Reaction Method and its Conditions

One-stage firing is performed to the mixed powder of the M element compound and the tungsten compound produced by the wet-mixing, or the mixed powder of the M element compound containing the impurity element compound and the tungsten compound, in the inert gas alone or mixed gas atmosphere of the inert gas and reducing gas. At this time, a firing temperature is preferably close to a temperature at which the composite tungsten oxide ultrafine particles start to crystallize, and specifically, the firing temperature is preferably 1000° C. or less, more preferably 800° C. or less, still more preferably 800° C. or less and 500° C. or more. By controlling the firing temperature, the value of the XRD peak top intensity ratio of the composite tungsten oxide ultrafine particles of the present invention can be set to a predetermined value.

In synthesizing the composite tungsten oxide ultrafine particles, tungsten trioxide may be used instead of the tungsten compound.

(3) Synthesized Composite Tungsten Oxide Ultrafine Particles

When the composite tungsten oxide ultrafine particle dispersion liquid described later is prepared using the composite tungsten oxide ultrafine particles obtained using the synthesis method by the thermal plasma method or the solid-phase reaction method, pulverization and dispersion treatment may be performed in the step of producing the composite tungsten oxide fine particle dispersion liquid described later when the dispersed particle size of the ultrafine particles contained in the dispersion liquid is more than 200 nm. Then, when the value of the XRD peak top intensity ratio of the composite tungsten oxide ultrafine particles obtained through the pulverization and dispersion treatment is within a range of the present invention, the composite tungsten oxide ultrafine particle dispersion body obtained from the composite tungsten oxide ultrafine particles and the dispersion liquid thereof according to the present invention, can realize excellent near infrared shielding properties.

[c] Volatile Component of the Composite Tungsten Oxide Ultrafine Particles and its Drying Treatment Method As described above, the composite tungsten oxide ultrafine particles of the present invention contain a volatile component in some cases, but the content of the volatile component is preferably 2.5 mass % or less. However, when the composite tungsten oxide ultrafine particles are exposed to the atmosphere or the like and the content of the volatile component exceeds 2.5 mass %, the content of the volatile component can be reduced by the drying treatment.

Specifically, the composite tungsten oxide synthesized by the above-described method is pulverized and dispersed to obtain finer particles, and the composite tungsten oxide ultrafine particles of the present invention can be produced through a step (pulverization and dispersion treatment step) of producing the composite tungsten oxide ultrafine particle dispersion liquid and a step of drying the composite tungsten oxide ultrafine particle dispersion liquid thus produced to remove the solvent (drying step).

Regarding the pulverizing and dispersing step, in order to describe in detail in the "[d] composite tungsten oxide ultrafine particle dispersion liquid" described later, the drying treatment step will be described here.

The drying treatment step is a step of applying drying treatment to the composite tungsten oxide ultrafine particle dispersion liquid obtained in a pulverizing and dispersing step described later to remove the volatile component in the dispersion liquid, to thereby obtain the composite tungsten oxide ultrafine particles of the present invention.

As facilities for drying treatment, an air dryer, a universal mixer, a ribbon mixer, a vacuum flow drier, an oscillating fluid drier, a freeze dryer, a ribbon corn, a rotary kiln, a spray dryer, a pulverized dryer, and the like are preferable from a viewpoint that heating and/or decompression is possible and mixing and recovery of the ultrafine particles is easy, but the present invention is not limited thereto.

As an example thereof, (1) A drying treatment by the air dryer, (2) A drying treatment by the vacuum flow drier, and (3) A drying treatment by a spray dryer will be described hereafter. Each drying treatment will be sequentially described hereinafter.

(1) Drying Treatment by an Air Dryer

This is a treatment method for applying drying treatment to the composite tungsten oxide ultrafine particle dispersion liquid obtained by a method described later to remove the volatile component in the dispersion liquid by an air dryer. In this case, it is preferable to perform the drying treatment at a temperature higher than the temperature at which the volatile component volatilizes from the composite tungsten oxide ultrafine particles and the temperature at which the element M is not desorbed, and 150° C. or less is preferable.

The composite tungsten oxide ultrafine particles produced by the drying treatment using the air dryer are weak secondary aggregates. Even in this state, it is possible to disperse the composite tungsten oxide ultrafine particles in a resin or the like, but in order to make it easier to disperse, it is also a preferable example to disintegrate the ultrafine particles by a mash-crushing machine or the like.

(2) Drying Treatment by a Vacuum Flow Dryer

This is a treatment method for removing the volatile component in the composite tungsten oxide ultrafine particle dispersion liquid by performing the drying treatment using the vacuum flow drier. In the vacuum flow drier, drying and disintegration treatments are performed at the same time under a reduced pressure atmosphere, and therefore in addition to having a high drying rate, aggregates as seen in the above-described dried product in the air dryer are not formed. Further, because of drying in the reduced pressure atmosphere, the volatile component can be removed even at a relatively low temperature, and an amount of a residual volatile component can be minimized as well.

The drying temperature is preferably set so as to be dried at a temperature at which the element M is not desorbed from the composite tungsten oxide ultrafine particles, and it is a temperature higher than a temperature at which the volatile component is volatilized, and it is desirably 150° C. or less.

(3) Drying Treatment by a Spray Dryer

This is a treatment method for removing the volatile component of the composite tungsten oxide ultrafine particle dispersion liquid by performing drying treatment using a spray dryer. In the spray dryer, secondary aggregation due to a surface force of the volatile component hardly occurs at the time of removing the volatile component in the drying treatment, and the composite tungsten oxide ultrafine particles that are not relatively secondary aggregated can be obtained even without disintegration treatment.

By dispersing the composite tungsten oxide ultrafine particles subjected to the drying treatment according to the above (1) to (3) in the resin or the like by an appropriate method, it is possible to form the composite tungsten oxide ultrafine particle dispersion body which is a near infrared shielding material fine particle dispersion body having optical properties that the haze value is low while having high visible light transmittance and low solar radiation transmittance due to the development of the near infrared ray absorbing function.

[d] Composite Tungsten Oxide Ultrafine Particle Dispersion Liquid

In the composite tungsten oxide ultrafine particle dispersion liquid of the present invention, the composite tungsten oxide ultrafine particles obtained by the above-described synthetic producing method, water, an organic solvent, a fat or oil, a liquid resin, a liquid plasticizer, a polymeric monomer, or a mixture thereof, and appropriate amount of dispersant, coupling agent, surfactant etc., are pulverized and dispersed using a medium stirring mill.

Then, it is preferable that a dispersion state of the composite tungsten oxide ultrafine particles in the solvent is good and the dispersed particle size thereof is 1 to 200 nm. It is also preferable that the content of the composite tungsten oxide ultrafine particles contained in the composite tungsten oxide ultrafine particle dispersion liquid is 0.01 mass % or more and 80 mass % or less.

The composite tungsten oxide ultrafine particle dispersion liquid of the present invention will be described hereafter in an order of (1) Solvent, (2) Dispersant, (3) Dispersion method, (4) Binder, (5) Additive, (6) Coating layer, 7) coating method, and (8) mixing method to base resin.

(1) Solvent

The liquid solvent used for the composite tungsten oxide ultrafine particle dispersion liquid is not particularly limited, and it may be appropriately selected according to a coating condition of the composite tungsten oxide ultrafine particle dispersion liquid, a coating environment, and an inorganic binder and a resin binder which are appropriately added. For example, the liquid solvent is water, an organic solvent, a fat or oil, a liquid resin, a liquid plasticizer, a polymeric monomer, or a mixture thereof.

Here, as the organic solvent, it is possible to use various types such as alcohol type, ketone type, hydrocarbon type, glycol type, water type and the like can be selected. Specifically, alcoholic solvents such as methanol, ethanol, 1-propanol, isopropanol, butanol, pentanol, benzyl alcohol, diacetone alcohol and the like; ketone type solvents such as acetone, methyl ethyl ketone, methyl propyl ketone, methyl isobutyl ketone, cyclohexanone, isophorone and the like; ester solvents such as 3-methyl-methoxy-propionate; Glycol derivatives such as ethylene glycol monomethyl ether, ethylene glycol monoethyl ether, ethylene glycol isopropyl ether, propylene glycol monomethyl ether, propylene glycol monoethyl ether, propylene glycol methyl ether acetate, propylene glycol ethyl ether acetate and the like; amides such as formamide, N-methylformamide, dimethylformamide, dimethylacetamide, N-methyl-2-pyrrolidone and the like; aromatic hydrocarbons such as toluene and xylene; ethylene chloride, chlorobenzene, etc. Then, among these organic solvents, dimethyl ketone, methyl ethyl ketone, methyl isobutyl ketone, toluene, propylene glycol monomethyl ether acetate, n-butyl acetate and the like are particularly preferable.

As described above, the described solvents can be used alone or in combination of two or more. Further, if necessary, pH may be adjusted by adding an acid or an alkali to these solvents.

As the fats and oils, vegetable fats and oils or vegetable-derived fats and oils are preferable. As the vegetable oils, drying oils such as linseed oil, sunflower oil, tung oil and eno oil, semidrying oils such as sesame oil, cottonseed oil, rapeseed oil, soybean oil, rice bran oil, poppy seed oil and the like, non-drying oils such as olive oil, coconut oil, palm oil, dehydrated castor oil, can be preferably used. As the vegetable oil-derived compound, fatty acid monoesters and ethers obtained by direct esterification reaction of fatty acid of vegetable oil and monoalcohol are preferably used. Further, commercially available petroleum-based solvents can also be used as fats and oils, and Isopar E, Exxol Hexane, Exol Heptane, Exol E, Exol D30, Exol D40, Exol D60, Exol D80, Exol D95, Exol D110, Exol D130 (all of them are manufactured by Exon Mobil Corporation), and the like can be used as preferable examples.

As the liquid plasticizer, known liquid plasticizer typified by carboxylic acid ester type, phosphate ester type and the like can be used.

As the polymeric monomer, a polymer is formed by polymerization or the like. A methyl methacrylate monomer, an acrylate monomer, a styrene resin monomer, and the like formed by polymerization or the like, can be used in the present invention.

(2) Dispersant

Further, in order to further improve a dispersion stability of the composite tungsten oxide ultrafine particles in the composite tungsten oxide ultrafine particle dispersion liquid and to prevent coarsening of the dispersed particle size by reaggregation, it is also preferable to add various dispersants, surfactants, coupling agents and the like. The dispersants, the coupling agents and the surfactants can be selected according to the application. Therefore, it is preferable to have an amine-containing group, a hydroxyl group, a carboxyl group, or an epoxy group as a functional group. A polymeric dispersant having one of these functional groups in a molecule is more preferable.

These functional groups are adsorbed on a surface of each composite tungsten oxide ultrafine particle to prevent aggregation and have an effect of uniformly dispersing the composite tungsten oxide ultrafine particles of the present invention even in a near infrared shielding layer.

(3) Dispersion Method

By applying the composite tungsten oxide ultrafine particle dispersion liquid onto a transparent substrate by an appropriate method or kneading it into a substrate, it is possible to form a composite tungsten oxide ultrafine particle dispersion body having near infrared shielding properties such that the haze value is low while having high visible light transmittance and low solar radiation transmittance.

The method for dispersing the composite tungsten oxide ultrafine particles in the dispersion liquid is not particularly limited as long as it is a method capable of uniformly dispersing the fine particles in the dispersion liquid without aggregation. Examples of the dispersion method include a pulverization and dispersion treatment method using a device such as a bead mill, a ball mill, a sand mill, a paint shaker, an ultrasonic homogenizer, or the like. Among them, it is more preferable to use media stirring mills such as a bead mill, a ball mill, a sand mill, or a paint shaker in which media (beads, beer, ottawa sand) is used, because pulverization and dispersion to a desired particle size is possible for a short time by such media stirring mills. Through pulverization and dispersion treatment using these media stirring mills, formation of the fine particles is accelerated due to collision of the composite tungsten oxide ultrafine particles and collision of media against the ultrafine particles simultaneously with the dispersion of the composite tungsten oxide ultrafine particles in the dispersion liquid, and the composite tungsten oxide ultrafine particles can be more finely pulverized and dispersed (namely, they are pulverized and dispersed).

When the dispersed particle size of each composite tungsten oxide ultrafine particle is 1 to 200 nm, light with a wavelength of 380 nm to 780 nm in a visible light region is not scattered by geometric scattering or Mie scattering, and therefore Haze is reduced and a visible light transmittance can be increased in the composite tungsten oxide ultrafine particle dispersion body described later, which is preferable. Further, in a Rayleigh scattering region, the scattered light is decreased in inverse proportion to the particle size of the sixth power, and therefore when the dispersed particle size is decreased, scattering is reduced and transparency is improved. Therefore, when the dispersed particle size is 200 nm or less, the scattered light becomes very small, which is preferable because the transparency is increased.

Here, the dispersed particle size of each composite tungsten oxide ultrafine particle in the composite tungsten oxide ultrafine particle dispersion liquid will be briefly described. The dispersed particle size of each composite tungsten oxide ultrafine particle is a size meaning a single particle of the composite tungsten oxide ultrafine particles dispersed in the solvent or a particle size of aggregated particles in which the composite tungsten oxide ultrafine particles are aggregated, and can be measured with various commercially available particle size distribution meters. For example, a sample of the composite tungsten oxide ultrafine particle dispersion liquid is sampled, and the particle size of the sample can be measured using a particle size measuring device based on dynamic light scattering method (ELS-8000 manufactured by Otsuka Electronics Co., Ltd.).

Further, the composite tungsten oxide ultrafine particle dispersion liquid in which the content of the composite tungsten oxide ultrafine particles obtained by the above-described production method is 0.01 mass % or more and 80 mass % or less, is excellent in liquid stability. When an appropriate liquid medium, dispersant, coupling agent, surfactant is selected, gelation of the dispersion liquid and sedimentation of particles do not occur for 6 months or more even when placed in a constant temperature bath at a temperature of 40° C., and the dispersed particle size can be maintained in a range of 1 to 200 nm.

(4) Binder

The composite tungsten oxide ultrafine particle dispersion body in which the composite tungsten oxide ultrafine particle dispersion liquid is coated on a transparent substrate and fixed to form a coating layer, has a layer structure in which only composite tungsten oxide ultrafine particles are deposited on a substrate. This layer shows a near infrared shielding effect as it is, but it is preferable to add one or more kinds selected from inorganic binders and resin binders at the time of dispersing the composite tungsten oxide ultrafine particles, in the above-described step of producing the composite tungsten oxide ultrafine particle dispersion liquid. This is because by adding the binder to the composite tungsten oxide ultrafine particle dispersion liquid, the following effect can be obtained in the produced composite tungsten oxide ultrafine particle dispersion body: it becomes possible to control optical properties such as a visible light transmittance by increasing or decreasing an addition amount of the binder, it is possible to improve adhesion of the composite tungsten oxide ultrafine particles to the substrate after coating, and it is possible to improve the hardness of the layer.

One or more kinds selected from an inorganic binder and a resin binder can be appropriately contained in the composite tungsten oxide ultrafine particle dispersion liquid. The type of the inorganic binder and the resin binder contained in the composite tungsten oxide ultrafine particle dispersion liquid is not particularly limited. As the inorganic binder, a metal alkoxide of silicon, zirconium, titanium or aluminum, a partial hydrolysis and polycondensation product thereof, or an organosilazane can be used. As the resin binder, a UV curing resin, a thermosetting resin, an electron beam curing resin, a room temperature curing resin, a thermoplastic resin and the like can be selected according to a purpose. Specifically, thermoplastic resin such as acrylic resin, thermosetting resin such as epoxy resin, polyethylene resin, polyvinyl chloride resin, polyvinylidene chloride resin, polyvinyl alcohol resin, polystyrene resin, polypropylene resin, ethylene vinyl acetate copolymer, polyester resin, polyethylene terephthalate resin, fluororesin, ionomer resin, polycarbonate resin, acrylic resin, polyvinyl butyral resin, PET resin, polyamide resin, polyimide resin, olefin resin, etc., can be used.

(5) Additive

Further, in order to improve the near infrared shielding properties of the composite tungsten oxide ultrafine particle dispersion body of the present invention, it is also preferable to appropriately add boride ultrafine particles expressed by a general formula $XB_m$ (wherein X is an alkaline earth element or a rare earth element containing yttrium, satisfying $4 \leq m \leq 6.3$) as needed into the dispersion liquid of the present invention. Note that the addition ratio at this time may be appropriately selected according to desired near infrared shielding properties.

Further, in order to adjust a color tone of the composite tungsten oxide ultrafine particle dispersion body, a well-known inorganic pigment such as carbon black or red iron oxide, and a known organic pigment can also be added.

Known ultraviolet absorbers, known near-infrared shielding materials of organic substances and phosphorus-based coloring preventing agents may be added into the composite tungsten oxide ultrafine particle dispersion liquid.

(6) Coating Layer

It is also preferable that by applying a coating liquid containing an alkoxide containing at least one of silicon, zirconium, titanium, and aluminum and/or a partially hydrolyzed polycondensation product of the alkoxide, on the layer on which the composite tungsten oxide ultrafine particle dispersion liquid has been formed on the substrate, followed by heating, and a coating layer of an oxide containing at least one of silicon, zirconium, titanium, and aluminum is formed on the layer, to thereby obtain a multilayer structure. This is because by adopting such a structure, a coated component is deposited while filling the gaps in which the composite tungsten oxide ultrafine particles are deposited as the first layer, and in order to suppress refraction of the visible light, the haze value of the layer is further reduced, and the visible light transmittance is improved, and further, the adhesion of the composite tungsten oxide ultrafine particles on the substrate is improved. Here, as a method for forming a coating layer composed of alkoxide containing at least one of silicon, zirconium, titanium, and aluminum and partial hydrolysis and polycondensation products thereof, on the layer made of the composite tungsten oxide ultrafine particles alone or mainly composed of the composite tungsten oxide ultrafine particles, the coating method is convenient from a viewpoint of ease of layer forming operation and cost.

The coating liquid used in the coating method is obtained by containing alkoxide containing one or more kinds of silicon, zirconium, titanium, and aluminum, or one or more partial hydrolytic condensation polymerized products of the alkoxide, in the solvent such as water or alcohol. The content thereof is preferably 40 mass % or less in terms of oxide in the coating obtained after heating. Further, it is also preferable to adjust pH by adding an acid or an alkali as necessary. An oxide coating layer of silicon, zirconium, titanium, aluminum or the like can be easily formed by applying the coating liquid as a second layer on a layer mainly composed of the composite tungsten oxide ultrafine particles followed by heating. In addition, it is also preferable to use an organosilazane solution as a component of the binder component or the coating liquid used in the coating liquid of the present invention.

(7) Coating Method

The substrate heating temperature after coating the tungsten oxide ultrafine particle dispersion liquid containing a metal alkoxide of silicon, zirconium, titanium, or aluminum and a hydrolyzed polymer thereof as an inorganic binder or a coating layer is preferably performed at 100° C. or more and further preferably at the boiling point of the solvent in the coating liquid. This is because when the substrate heating temperature is 100° C. or more, the polymerization reaction of the metal alkoxide or the hydrolyzed polymer of the metal alkoxide contained in the coating layer can be completed. Further, this is because when the substrate heating temperature is 100° C. or more, water or an organic solvent as a solvent does not remain in the layer, and therefore in the layer after heating, these solvents do not cause reduction of the visible light transmittance.

When the resin binder is added to the composite tungsten oxide ultrafine particle dispersion liquid, the resin binder may be cured according to each resin curing method. For example, if the resin binder is an ultraviolet curing resin, ultraviolet rays may be appropriately irradiated, and if the resin binder is a room temperature setting resin, it may be left as it is after coating. By adopting this structure, coating on an existing window glass or the like, is possible on site.

The composite tungsten oxide ultrafine particle dispersion liquid and the coating method using the coating liquid according to the present invention are not particularly limited. For example, a method for uniformly applying a treatment liquid flatly and thinly, such as a spin coating method, a bar coating method, a spray coating method, a dip coating method, a screen printing method, a roll coating method, flow coating, or the like, can be preferably used.

(8) Mixing Method into Base Resin

Further, separately from the above-described coating on the substrate, the composite tungsten oxide ultrafine particles and the composite tungsten oxide ultrafine particle dispersion liquid of the present invention can be mixed into the base resin and kneaded thereinto.

When the above-described composite tungsten oxide ultrafine particles or the composite tungsten oxide ultrafine particle dispersion liquid is kneaded into the resin of the substrate, any known method may be appropriately selected as long as the composite tungsten oxide ultrafine particles are uniformly dispersed in the resin. Further, it can be mixed and melt at a temperature near the melting point of the resin, pelletized, and molded into various shapes such as plate, sheet, and layer, etc. by each known method.

Examples of the resin include a PET resin, an acrylic resin, a polyamide resin, a vinyl chloride resin, a polycarbonate resin, an olefin resin, an epoxy resin, a polyimide resin, and a fluororesin.

EXAMPLES

The present invention will be specifically described hereafter, with reference to examples. However, the present invention is not limited to the examples described below.

Note that the optical properties of the dispersion liquid, the coating layer and cured layer in the examples and comparative examples were measured using a spectrophotometer (U-4100, manufactured by Hitachi, Ltd.), and the visible light transmittance and the solar radiation transmittance were calculated according to JIS R 3106. Further, the dispersed particle size was shown by an average value measured by a particle size measuring device based on dynamic light scattering method (ELS-8000 manufactured by Otsuka Electronics Co., Ltd.). The average particle size of each composite tungsten oxide ultrafine particle dispersed in the cured layer which is the composite tungsten oxide ultrafine particle dispersion body was measured by observing a transmission electron microscope image of the cross-section of the cured layer. The transmission electron microscope image was observed using a transmission electron microscope (HF-2200, manufactured by Hitachi High-Technologies Corporation). The transmission electron microscopic image was processed using an image processing device to measure the particle size of 100 composite tungsten oxide ultrafine particles and the average value thereof was taken as the average particle size. An X-ray diffraction pattern was measured by a powder X-ray diffraction method (0-20 method) using a powder X-ray diffractometer (X'Pert-PRO/MPD manufactured by Spectris Co., Ltd. PANalytical). Further, in order to ensure objective quantification, every time the X-ray diffraction pattern of the composite tungsten oxide ultrafine particles was measured, the X-ray diffraction pattern of a silicon powder standard sample was measured, and the peak intensity ratio was calculated each time.

Example 1

0.216 kg of $Cs_2CO_3$ was dissolved in 0.330 kg of water, which was then added to 1.000 kg of $H_2WO_4$, sufficiently stirred, and then dried to obtain a mixed powder of $Cs_{0.33}WO_3$ as a target composition.

Next, the high-frequency plasma reaction device described in FIG. 1 was used, and the inside of the reaction system was evacuated to about 0.1 Pa (about 0.001 Torr) by a vacuum evacuation device, and then the inside of the reaction system was completely replaced with argon gas to obtain a flow system of 1 atm. Thereafter, argon gas was introduced as a plasma gas into the reaction vessel at a flow rate of 30 L/min, and the argon gas and a helium gas were introduced as a sheath gas from a sheath gas feed port at a flow rate of 55 L/min and 5 L/min. Then, high-frequency power was applied to a water cooled copper coil to generate high-frequency plasma. At this time, in order to generate thermal plasma having a high temperature part of 10000 to 15000 K, the high-frequency power was set to 40 KW.

In this way, after generating the high-frequency plasma, the mixed powder was supplied into the thermal plasma at a rate of 50 g/min while feeding the argon gas as a carrier gas at a flow rate of 9 L/min from the gas feeding device.

As a result, the mixed powder was instantaneously evaporated in the thermal plasma, and rapidly solidified in a process of reaching the plasma tail flame part, resulting in ultrafine particles. The generated ultrafine particles were deposited on a recovery filter.

Figure 2:
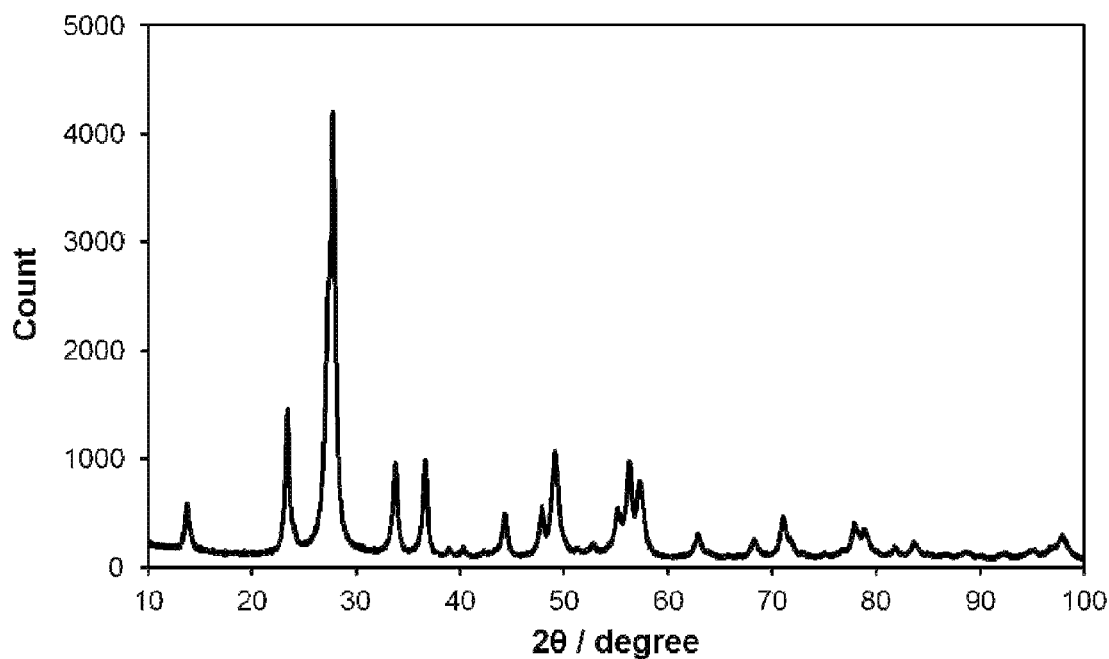
FIG. 2 is an X-ray diffraction pattern of ultrafine particles according to example 1.

The deposited ultrafine particles were recovered, and the X-ray diffraction pattern was measured by a powder X-ray diffraction method (0-20 method) using a powder X-ray diffractometer (X'Pert-PRO/MPD manufactured by Spectris Corporation PANalytical). The X-ray diffraction pattern of the obtained ultrafine particles is shown in FIG. 2. As a result of phase identification, the obtained ultrafine particles were identified as a hexagonal $Cs_{0.33}WO_3$ single phase. Further, when crystal structure analysis by the Rietveld analysis method was performed using the X-ray diffraction pattern, the crystallite size of each obtained ultrafine particles was 18.8 nm. Further, the value of the peak top intensity of the X-ray diffraction pattern of the obtained ultrafine particles was 4200 counts.

The composition of the obtained ultrafine particles was examined by ICP emission spectrometry. As a result, Cs concentration was 13.6 mass %, W concentration was 65.3 mass %, and a molar ratio of Cs/W was 0.29. It was confirmed that a remained part other than Cs and W was oxygen and no other impurity element contained in an amount of 1 mass % or more was present.

When a BET specific surface area of the obtained ultrafine particles was measured using a BET specific surface area measuring device (HM model 1208 manufactured by Mountech), it was 60.0 $m^2/g$. Note that nitrogen gas having a purity of 99.9% was used for measurement of the BET specific surface area.

Further, when the content of the volatile component of the composite tungsten oxide ultrafine particles of example 1 was measured using a moisture meter (MOC 63u, manufactured by Shimadzu Corporation), it was 1.6 mass %. Note that the temperature was raised from room temperature to 125° C. for 1 minute from start of the measurement, kept at 125° C. for 9 minutes, and a weight reduction rate after 10 minutes from the start of the measurement was taken as the content of the volatile component.

20 parts by weight of the obtained composite tungsten oxide ultrafine particles, 64 parts by weight of methyl isobutyl ketone, and 16 parts by weight of an acrylic polymer dispersant (amine value: 48 mg KOH/g, acrylic dispersant having a decomposition temperature of 250° C.) having a group containing an amine as a functional group (referred to as "dispersant a" hereafter) were mixed, to prepare a slurry of 3 kg. This slurry was charged into a medium stirring mill together with beads and subjected to pulverization and dispersion treatment for 1 hour. Note that a horizontal cylindrical annular type (manufactured by Ashizawa Co., Ltd.) was used as the medium stirring mill, in which an inner wall of a vessel and a material of a rotor (rotary stirring part) were made of zirconia. Further, beads made of YSZ (Yttria-Stabilized Zirconia: yttria-stabilized zirconia) having a diameter of 0.1 mm were used as the beads. A rotation speed of the rotor was set to 14 rpm/sec, and a flow rate of the slurry was set to 0.5 kg/min to perform pulverization and dispersion treatment to obtain the composite tungsten oxide ultrafine particle dispersion liquid of example 1.

The composite tungsten oxide ultrafine particles contained in the composite tungsten oxide ultrafine particle dispersion liquid of example 1, namely, the value of the peak top intensity in the X-ray diffraction pattern of the composite tungsten oxide ultrafine particles after the pulverization and dispersion treatment was 3000 counts, and a peak position was 2θ=27.8°.

On the other hand, when a silicon powder standard sample (NIST, 640c) was prepared, and a value of the peak intensity was measured with plane (220) in this silicon powder standard sample as a reference, it was 19800 counts. Accordingly, it was found that the value of the XRD peak intensity ratio of the composite tungsten oxide ultrafine particles after the pulverization and dispersion treatment according to example 1 was 0.15 when the peak intensity value of the standard sample was set to 1.

Further, the crystallite size of each composite tungsten oxide ultrafine particle after the pulverization and dispersion treatment according to example 1 was 16.9 nm.

Further, when the dispersed particle size of each particle in the composite tungsten oxide ultrafine particle dispersion liquid of example 1 was measured using a particle size measuring device based on a dynamic light scattering method (ELS-8000 manufactured by Otsuka Electronics Co., Ltd.), it was 70 nm. Note that as a setting of a particle size measurement, a particle refractive index was set to 1.81, and a particle shape was set as nonspherical. Further, a background was measured using methyl isobutyl ketone and a solvent refractive index was set to 1.40.

Next, when the composite tungsten oxide ultrafine particle dispersion liquid thus obtained was diluted with methyl isobutyl ketone in a measurement glass cell of a spectrophotometer so that the visible light transmittance was 70%, and measurement was performed at an interval of 5 nm in a wavelength range of 200 nm to 2600 nm by a spectrophotometer (U-4100 manufactured by Hitachi, Ltd.) to calculate the solar radiation transmittance, it was 34.8%. Note that the visible light transmittance and the solar radiation transmittance were calculated based on JIS R 3106. Further, in this measurement, an incident direction of a light of the spectrophotometer was set to be perpendicular to the measurement glass cell. Further, a blank solution containing only methyl isobutyl ketone as a solvent in the measurement glass cell is used as the baseline of light transmittance.

Example 2

The composite tungsten oxide ultrafine particle dispersion liquid obtained in example 1 was mixed with ultraviolet curing resin and solvent methyl isobutyl ketone, and a glass substrate having a thickness of 3 mm was coated with this composite tungsten oxide ultrafine particle dispersion liquid to form a coating layer using a bar coater (IMC-700 manufactured by Imoto Seisakusho), and the solvent was evaporated from this coating layer, and then ultraviolet irradiation was performed to obtain a cured layer which was a composite tungsten oxide ultrafine particle dispersion body obtained by curing the coating layer. At this time, the concentration of the dispersion liquid was previously adjusted by diluting the solvent with methyl isobutyl ketone so that the cured layer had a visible light transmittance of 70%.

When the average particle size of the composite tungsten oxide ultrafine particles dispersed in the cured layer obtained in example 2 was calculated by an image processing device using a transmission electron microscope image, it was 17 nm, and was almost the same as the above-described crystallite size of 16.9 nm.

Figure 3:
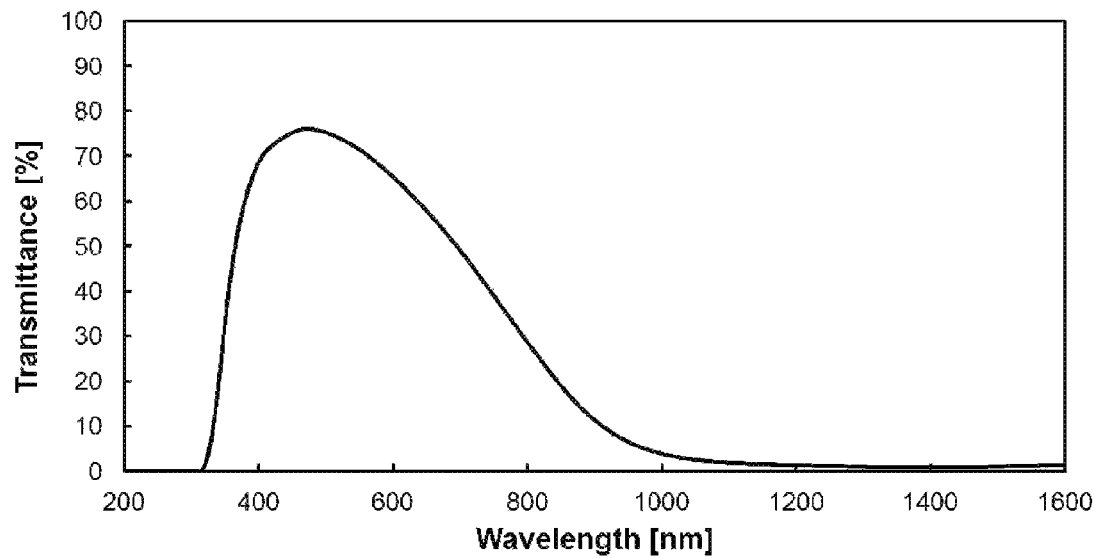
FIG. 3 is a profile of a transmittance of a cured layer according to example 2.

When the haze of the cured layer of example 2 was measured based on JIS K 7105 using a haze meter (HM-150, manufactured by Murakami Color Research Laboratory), it was 0.4%. Further, when the transmittance of the obtained cured layer of example 2 was measured at interval of 5 nm in a wavelength range of 200 nm to 2600 nm by a spectrophotometer (U-4100, manufactured by Hitachi, Ltd.), a transmission profile shown in FIG. 3 was obtained. When the solar radiation transmittance was obtained from the obtained transmission profile, it was 36.5%. Further, the cured layer of example 2 was irradiated with a pseudo sunlight using an artificial sunlight (XC-100, manufactured by Celic Corporation), and the presence or absence of a blue haze phenomenon was visually confirmed. As a result, it was confirmed that there was no blue haze phenomenon.

Examples 3 to 7

The composite tungsten oxide ultrafine particles and the composite tungsten oxide ultrafine particle dispersion liquid of examples 3 to 7 were produced in the same manner as in examples 1 to 2, except that the carrier gas flow rate, the plasma gas flow rate, the sheath gas flow rate, and the raw material feed rate were changed. Table 1 shows the changed carrier gas flow rate condition, material feed rate condition, and other conditions. Evaluations similar to those of examples 1 and 2 were performed for the composite tungsten oxide ultrafine particles and the composite tungsten oxide ultrafine particle dispersion liquid, its coating layer, and its cured layer of examples 3 to 7. The evaluation results are shown in Tables 1 and 2.

Examples 8

The mixed powder of $Cs_2CO_3$ and $H_2WO_4$ described in example 1 was changed to the composite tungsten oxide expressed by $Cs_{0.33}WO_3$ fired at 800° C. under a mixed gas atmosphere of nitrogen gas and hydrogen gas, and was used as a raw material to be charged into a high-frequency plasma reactor. The composite tungsten oxide ultrafine particles and the composite tungsten oxide ultrafine particle dispersion liquid of example 8 were produced in the same manner as in examples 1 and 2 except for the above. Evaluations similar to those of examples 1 to 7 were performed for the obtained ultrafine particles and the dispersion liquid thereof. The production conditions and evaluation results are shown in Tables 1 and 2.

Example 9

The composite tungsten oxide ultrafine particles and the composite tungsten oxide ultrafine particle dispersion liquid of example 9 were produced in the same manner as in example 8 except that the carrier gas flow rate and the raw material feed rate were changed. Evaluations similar to those of examples 1 to 8 were performed for the obtained ultrafine particles, the dispersion liquid thereof, its coating layer, and its cured layer. The production conditions and evaluation results are shown in Tables 1 and 2.

Example 10

0.148 kg of $Rb_2CO_3$ was dissolved in 0.330 kg of water, added to 1.000 kg of $H_2WO_4$, sufficiently stirred, and then dried to obtain a mixed powder of $Rb_{0.32}WO_3$ as a target composition.

The composite tungsten oxide ultrafine particles and the composite tungsten oxide ultrafine particle dispersion liquid of example 10 were produced in the same manner as in example 1, except that the mixed powder was used as the raw material to be charged into the high-frequency thermal plasma reactor. Evaluations similar to those of examples 1 to 9 were performed for the obtained ultrafine particles, the dispersion liquid thereof, its coating layer, and its cured layer. The production conditions and evaluation results are shown in Tables 1 and 2.

Example 11

0.375 kg of $K_2CO_3$ was dissolved in 0.330 kg of water, added to 1.000 kg of $H_2WO_4$, sufficiently stirred, and then dried to obtain a mixed powder of $K_{0.27}WO_3$ as a target composition.

The composite tungsten oxide ultrafine particles and the composite tungsten oxide ultrafine particle dispersion liquid of example 11 were produced in the same manner as in example 1, except that the mixed powder was used as the raw material to be charged into the high-frequency thermal plasma reactor. Evaluations similar to those of examples 1 to 10 were performed for the obtained ultrafine particles, the dispersion liquid thereof, its coating layer, and its cured layer. The production conditions and evaluation results are shown in Tables 1 and 2.

Example 12

0.320 kg of $TlNO_3$ was dissolved in 0.330 kg of water, added to 1.000 kg of $H_2WO_4$, sufficiently stirred, and then dried to obtain a mixed powder of target $Tl_{0.19}WO_3$ as a target composition.

The composite tungsten oxide ultrafine particles and the composite tungsten oxide ultrafine particle dispersion liquid of example 12 were produced in the same manner as in example 1, except that the mixed powder was used as the raw material to be charged into the high-frequency thermal plasma reactor. Evaluations similar to those of examples 1 to 11 were performed for the obtained ultrafine particles, the dispersion liquid thereof, its coating layer, and its cured layer. The production conditions and evaluation results are shown in Tables 1 and 2.

Example 13

0.111 kg of $BaCO_3$ was dissolved in 0.330 kg of water, added to 1.000 kg of $H_2WO_4$, sufficiently stirred, and then dried to obtain a mixed powder of $Ba_{0.14}WO_3$ as a target composition.

The composite tungsten oxide ultrafine particles and the composite tungsten oxide ultrafine particle dispersion liquid of example 13 were produced in the same manner as in example 1, except that the mixed powder was used as the raw material to be charged into the high-frequency thermal plasma reactor. Evaluations similar to those of examples 1 to 12 were performed for the obtained ultrafine particles, the dispersion liquid thereof, its coating layer, and its cured layer. The production conditions and evaluation results are shown in Tables 1 and 2.

Example 14

0.0663 kg of $K_2CO_3$ and 0.0978 kg of $Cs_2CO_3$ were dissolved in 0.330 kg of water, added to 1.000 kg of $H_2WO_4$, sufficiently stirred, and then dried to obtain a mixed powder of $K_{0.24}Cs_{0.15}WO_3$ as a target composition.

The composite tungsten oxide ultrafine particles and the composite tungsten oxide ultrafine particle dispersion liquid of example 14 were produced in the same manner as in example 1, except that the mixed powder was used as the raw material to be charged into the high-frequency thermal plasma reactor. Evaluations similar to those of examples 1 to 13 were performed for the obtained ultrafine particles, the dispersion liquid thereof, its coating layer, and its cured layer. The production conditions and evaluation results are shown in Tables 1 and 2.

Example 15

10.8 g of $Cs_2CO_3$ was dissolved in 16.5 g of water, the solution was added to 50 g of $H_2WO_4$, sufficiently stirred, and then dried. While feeding 2% $H_2$ gas with $N_2$ gas as a carrier, the dried product was heated, and fired at a temperature of 800° C. for 30 minutes. Thereafter, the composite tungsten oxide ultrafine particles of example 15 were obtained by the solid-phase method of firing at 800° C. for 90 minutes under an $N_2$ gas atmosphere.

The composite tungsten oxide ultrafine particle dispersion liquid of example 15 was produced in the same manner as in example 1 except for the above. However, the pulverization and dispersion treatment time by the medium stirring mill was set to 4 hours. Evaluations similar to those of examples 1 to 14 were performed for the obtained ultrafine particles, the dispersion liquid thereof, its coating layer, and its cured layer. The production conditions and evaluation results are shown in Tables 1 and 2.

Examples 16 to 25

0.044 kg of $Li_2CO_3$ was dissolved in 0.330 kg of water, added to 1.000 kg of $H_2WO_4$, sufficiently stirred, and then dried to obtain a mixed powder of $Li_{0.3}WO_3$ of example 16 as a target composition.

0.021 kg of $Na_2CO_3$ was dissolved in 0.330 kg of water, added to 1.000 kg of $H_2WO_4$, sufficiently stirred, and then dried to obtain a mixed powder of $Na_{0.1}WO_3$ of example 17 as a target composition.

0.251 kg of $Cu(NO_3)_2 \cdot 3H_2O$ was dissolved in 0.330 kg of water, added to 1.000 kg of $H_2WO_4$, sufficiently stirred, and then dried to obtain a mixed powder of $Cu_{0.26}WO_{2.72}$ of example 18 as a target composition.

0.005 kg of $Ag_2CO_3$ was dissolved in 0.330 kg of water, added to 1.000 kg of $H_2WO_4$, sufficiently stirred, and then dried to obtain a mixed powder of $Ag_{0.01}WO_3$ of example 19 as a target composition.

0.040 kg of $CaCO_3$ was dissolved in 0.330 kg of water, added to 1.000 kg of $H_2WO_4$, sufficiently stirred, and then dried to obtain a mixed powder of $Ca_{0.1}WO_3$ of example 20 as a target composition.

0.047 kg of $SrCO_3$ was dissolved in 0.330 kg of water, added to 1.000 kg of $H_2WO_4$, sufficiently stirred, and then dried to obtain a mixed powder of $Sr_{0.08}WO_3$ of example 21 as a target composition.

0.011 kg of $In_2O_3$ and 1.000 kg of $H_2WO_4$ were sufficiently mixed by a mash-crushing machine to obtain a mixed powder of $In_{0.02}WO_3$ of example 22 as a target composition.

0.115 kg of $SnO_2$ and 1.000 kg of $H_2WO_4$ were sufficiently mixed by the mash-crushing machine to obtain a mixed powder of $Sn_{0.19}WO_3$ of example 23 as a target composition.

0.150 kg of $Yb_2O_3$ and 1.000 kg of $H_2WO_4$ were sufficiently mixed by the mash-crushing machine to obtain a mixed powder of $Yb_{0.19}WO_3$ of example 24 as a target composition.

0.115 kg of Snowtex S manufactured by Nissan Chemical Industries, Ltd. and 1.000 kg of $H_2WO_4$ were sufficiently mixed by the mash-crushing machine to obtain a mixed powder of $Si_{0.043}WO_{2.839}$ of example 25 as a target composition. Note that Snowtec S is an ultrafine silica powder.

The composite tungsten oxide ultrafine particles and the composite tungsten oxide ultrafine particle dispersion liquid of examples 16 to 25 were produced in the same manner as in example 1 except that the mixed powder of examples 16 to 25 was used as the raw material to be charged into the high-frequency thermal plasma reactor. Evaluations similar to those of examples 1 to 15 were performed for the obtained ultrafine particles, the dispersion liquid thereof, its coating layer, and its cured layer. The production conditions and evaluation results are shown in Tables 1 and 2.

Example 26

0.216 g of $Cs_2CO_3$ was dissolved in 0.330 g of water, the solution was added to 1.000 kg of $H_2WO_4$, sufficiently stirred, and then dried to obtain a dried product. While feeding 5% $H_2$ gas with $N_2$ gas as a carrier, the dried product was heated, and fired at a temperature of 800° C. for 1 hour. Thereafter, the solid-phase reaction method was performed for further firing the dried product at 800° C. in the $N_2$ gas atmosphere for 2 hours, to obtain the composite tungsten oxide.

20 parts by weight of the obtained composite tungsten oxide and 80 parts by weight of water were mixed to prepare a slurry of about 3 kg. Note that no dispersant was added to this slurry. This slurry was charged into a medium stirring mill together with beads and subjected to pulverization and dispersion treatment for 4 hours. A horizontal cylindrical annular type (made by Ashizawa Co., Ltd.) was used as the medium stirring mill, and the inner wall of the vessel and the material of the rotor (rotary stirring part) were made of zirconia. Further, beads made of YSZ (Yttria-Stabilized Zirconia: yttria-stabilized zirconia) having a diameter of 0.1 mm were used for the beads. The pulverization and dispersion treatment was performed at a rotation speed of the rotor set to 14 rpm/sec, and a slurry flow rate set to 0.5 kg/min, to obtain an aqueous composite tungsten oxide ultrafine particle dispersion liquid.

When the dispersed particle size of each particle in the composite tungsten oxide ultrafine particle aqueous dispersion liquid of example 26 was measured, it was 70 nm. Note that as a setting of the dispersed particle size measurement, a particle refractive index was set to 1.81, and a particle shape was set as nonspherical. Further, a background was measured with water, and the solvent refractive index was set to 1.33.

Next, approximately 3 kg of the obtained composite tungsten oxide ultrafine particle aqueous dispersion liquid was dried in an air dryer, to obtain the composite tungsten oxide ultrafine particles of example 26. Note that for the air dryer, a thermostatic oven SPH-201 type (manufactured by Espec Corporation) was used, a drying temperature was set to 70° C., and a drying time was set to 96 hours.

The X-ray diffraction pattern of the composite tungsten oxide ultrafine particles of example 26 was measured and a phase was identified, and as a result, the obtained ultrafine particles were identified as having a hexagonal $Cs_{0.33}WO_3$ single phase. Further, in the X-ray diffraction pattern of the obtained ultrafine particles, the peak top intensity was 4200 counts, the peak position was $2\theta=27.8°$, and the crystallite size was 23.7 nm. On the other hand, when a silicon powder standard sample (manufactured by NIST, 640c) was prepared and a value of the peak intensity was measured, with plane (220) in the silicon powder standard sample as a reference, it was 19,800 counts. Accordingly, it was found that the value of the XRD peak intensity ratio of the composite tungsten oxide ultrafine particles was 0.21 after the pulverization and dispersion treatment of example 1, when the value of the peak intensity of the standard sample was set to 1.

The composition of the obtained ultrafine particles was examined by ICP emission spectrometry. As a result, Cs concentration was 15.2 mass %, W concentration was 64.6 mass %, and the molar ratio of Cs/W was 0.33. It was confirmed that a balance other than Cs and W was oxygen and no other impurity element contained by 1 mass % or more was present.

When the BET specific surface area of the composite tungsten oxide ultrafine particles of example 26 obtained by pulverization was measured, it was 42.6 $m^2/g$.

Further, when the content of the volatile component of the composite tungsten oxide ultrafine particles of example 26 was measured, it was 2.2 mass %.

Further, 20 parts by weight of the obtained composite tungsten oxide ultrafine particles were dispersed in 64 parts by weight of methyl isobutyl ketone as a solvent and 16 parts by weight of dispersant "a", to obtain 50 g of the composite tungsten oxide ultrafine particle dispersion liquid of example 26.

When the dispersed particle size of each particle in the composite tungsten oxide ultrafine particle dispersion liquid of example 26 was measured, it was 80 nm. Note that as a setting of the particle size measurement, the particle refractive index was set to 1.81, and the particle shape was set as nonspherical. Further, the background was measured using methyl isobutyl ketone and the solvent refractive index was set to 1.40.

Next, when the composite tungsten oxide ultrafine particle dispersion liquid thus obtained was diluted with methyl isobutyl ketone in the measurement glass cell of a spectrophotometer so that the visible light transmittance was 70%, and measurement was performed at interval of 5 nm in the wavelength range of 200 nm to 2600 nm by the spectrophotometer (U-4100 manufactured by Hitachi, Ltd.) to calculate the solar radiation transmittance, it was 34.1%. Note that the visible light transmittance and the solar radiation transmittance were calculated based on JIS R 3106. Further, in this measurement, the incident direction of the light of the spectrophotometer was set to be perpendicular to the measurement glass cell. Further, a blank solution containing only methyl isobutyl ketone as a solvent in the measurement glass cell is used as the baseline of light transmittance.

The composite tungsten oxide ultrafine particle dispersion liquid thus obtained was mixed with ultraviolet curing resin and methyl isobutyl ketone as a solvent, to prepare a coating liquid. The surface of the glass substrate having a thickness of 3 mm was coated with the coating liquid using a bar coater to form a coating layer. After the solvent was evaporated from the coating layer, the coating layer was irradiated with ultraviolet rays and cured, to obtain a cured layer. At this time, the concentration of the dispersion liquid was adjusted by diluting the solvent with methyl isobutyl ketone in advance so that the cured layer had a visible light transmittance of 70%.

When the average particle size of the composite tungsten oxide ultrafine particles dispersed in the cured layer of example 26 was calculated by an image processing device using a transmission electron microscope image, it was 23 nm which was almost the same as the above-described crystallite size of 23.7 nm.

When the haze of the obtained cured layer of example 26 was measured, it was 0.3%. Further, the transmittance of the obtained cured layer of example 1 was measured at interval of 5 nm in the wavelength range of 200 nm to 2600 nm, to obtain a transmission profile shown in FIG. 3. When the solar radiation transmittance was obtained from the obtained transmission profile, it was 35.7%. Further, the presence or absence of a blue haze phenomenon of the cured layer of example 26 was visually confirmed in the same manner as in example 2, and it was confirmed that there was no blue haze phenomenon.

Table 1 and Table 2 show the production conditions of the composite tungsten oxide ultrafine particles and the evaluation results of the dispersion liquid, the coating layer, and the cured layer of example 26.

Example 27

The composite tungsten oxide ultrafine particles and the composite tungsten oxide ultrafine particle dispersion liquid of example 27 were produced in the same manner as in example 26 except that the drying treatment by the air dryer was changed to a vacuum drying treatment by a vacuum stirring type mash-crushing machine. An Ishikawa type stirring type mash-crushing machine 24P type (manufactured by Tajima Kagaku Kikai Co., Ltd.) was used as the vacuum stirring type mash-crushing machine, and the drying temperature at the time of the vacuum drying treatment was set to 80° C., the drying time was set to 32 hours, the rotation frequency of the kneading mixer was set to 40 Hz, and a pressure in a vacuum container was set to 0.001 MPa or less. Evaluations similar to those of examples 1 and 2 were performed for the obtained ultrafine particles, the dispersion liquid thereof, its coating layer and its cured layer. The production conditions and evaluation results are shown in Tables 1 and 2.

Example 28

The composite tungsten oxide ultrafine particles and the composite tungsten oxide ultrafine particle dispersion liquid of example 28 were produced in the same manner as in example 26 except that the drying treatment by the air dryer was changed to a spray drying treatment by a spray dryer. A spray dryer ODL-20 type (manufactured by Ohkawara Kakohki Co., Ltd.) was used as the spray dryer. Evaluations similar to those of examples 1 and 2 were performed for the obtained ultrafine particles, the dispersion liquid thereof, its coating layer and its cured layer. The production conditions and evaluation results are shown in Tables 1 and 2.

Examples 29 to 31

The composite tungsten oxide ultrafine particles and the composite tungsten oxide ultrafine particle dispersion liquid of examples 29 to 31 were produced in the same manner as in examples 26 to 28 except that the pulverization and dispersion treatment time by the medium stirring mill was changed to 2 hours. However, the pulverization and dispersion treatment time by the medium stirring mill was set to 2 hours. Evaluations similar to those of examples 1 and 2 were performed for the obtained ultrafine particles, the dispersion liquid thereof, its coating layer and its cured layer. The production conditions and evaluation results are shown in Tables 1 and 2.

Examples 32 to 34

The composite tungsten oxide ultrafine particles and the composite tungsten oxide ultrafine particle dispersion liquid of examples 32 to 34 were produced by the same synthetic producing method as in the above-described examples 29 to 31, except that 20 parts by weight of the composite tungsten oxide and 80 parts by weight of propylene glycol monoethyl ether were mixed in preparing the slurry. Evaluations similar to those of examples 1 and 2 were performed for the obtained ultrafine particles, the dispersion liquid thereof, its coating layer and its cured layer of examples 32 to 34. Note that when measuring the dispersed particle size, the background was measured with propylene glycol monoethyl ether, and the solvent refractive index was set to 1.40. The production conditions and evaluation results are shown in Tables 1 and 2.

Examples 35

The composite tungsten oxide ultrafine particles were obtained in the same manner as in example 1. Thereafter, 20 parts by weight of the obtained ultrafine particles, 64 parts by weight of methyl isobutyl ketone, and 16 parts by weight of dispersant "a" were mixed to prepare 50 g of slurry. The slurry was subjected to dispersion treatment for 1 hour with an ultrasonic homogenizer (US-600TCVP, manufactured by Nippon Seiki Seisakusho Co., Ltd.) to obtain the composite tungsten oxide ultrafine particle dispersion liquid of example 35. Evaluations similar to those of examples 1 and 2 were performed for the composite tungsten oxide ultrafine particle dispersion liquid, its coating layer, and its cured layer of examples 35. The evaluation results are shown in Table 2.

Comparative Examples 1 and 2

The composite tungsten oxide ultrafine particles and the composite tungsten oxide ultrafine particle dispersion liquid of comparative examples 1 and 2 were produced in the same manner as in example 1 except that the carrier gas flow rate, the plasma gas flow rate, the sheath gas flow rate, and the raw material feed rate were changed. Table 1 shows the changed carrier gas flow rate condition, raw material feed rate condition, and other conditions. Evaluations similar to those of examples 1 and 2 were performed for the obtained ultrafine particles and the dispersion liquid thereof, its coating layer, and its cured layer. The evaluation results are shown in Table 2.

Comparative Examples 3

The composite tungsten oxide ultrafine particles and the composite tungsten oxide ultrafine particle dispersion liquid of comparative example 3 were produced in the same manner as in example 1, except that in order to generate a thermal plasma having a high temperature part of 5000 to 10000 K, the high-frequency power was set to 15 KW. Evaluations similar to those of examples 1 and 2 were performed for the obtained ultrafine particles and the dispersion liquid thereof, its coating layer, and its cured layer. The evaluation results are shown in Tables 1 and 2.

Comparative Examples 4

The composite tungsten oxide ultrafine particle aqueous dispersion liquid of comparative example 4 was obtained in the same manner as in example 26, except that the composite tungsten oxide ultrafine particle aqueous dispersion liquid of example 26 was obtained by pulverization and dispersion treatment for 40 hours instead of 4 hours. When the dispersed particle size of the composite tungsten oxide ultrafine particle aqueous dispersion liquid of comparative example 4 was measured, it was 120 nm. Note that as the setting of the dispersed particle size measurement, the particle refractive index was set to 1.81, and the particle shape was set as nonspherical. Further, the background was measured with water, and the solvent refractive index was set to 1.33.

The X-ray diffraction pattern of the composite tungsten oxide ultrafine particles of comparative example 4 was measured and a phase was identified, and as a result, the obtained ultrafine particles were identified as having a hexagonal $Cs_{0.33}WO_3$ single phase. Further, the peak top intensity of the X-ray diffraction pattern of the obtained ultrafine particles was 1,300 counts, the peak position was $2\theta=27.8°$, and the crystallite size was 8.1 nm. On the other hand, when the silicon powder standard sample (manufactured by NIST, 640c) was prepared and the value of the peak intensity was measured, with plane (220) in the silicon powder standard sample as a reference, it was 19,800 counts. Accordingly, it was found that the value of the XRD peak intensity ratio of the composite tungsten oxide ultrafine particles was 0.07 after the pulverization and dispersion treatment of comparative example 4, when the value of the peak intensity of the standard sample was set to 1.

When the BET specific surface area of the composite tungsten oxide ultrafine particles of comparative example 4 obtained by pulverization was measured, it was 102.8 $m^2/g$.

Further, when the content of the volatile component of the composite tungsten oxide ultrafine particles of comparative example 4 was measured, it was 2.2 mass %.

20 parts by weight of the obtained composite tungsten oxide ultrafine particles were dispersed in 64 parts by weight of methyl isobutyl ketone and 16 parts by weight of dispersant "a", to obtain 50 g of the composite tungsten oxide ultrafine particle dispersion liquid of comparative example 4. Then, when the dispersed particle size of the composite tungsten oxide ultrafine particle dispersion liquid was measured, it was 120 nm. Note that as the setting of the dispersed particle size measurement, the particle refractive index was set to 1.81, and the particle shape was set as nonspherical. Note that the background was measured with methyl isobutyl ketone, and the solvent refractive index was set to 1.40.

Next, when the composite tungsten oxide ultrafine particle dispersion liquid of comparative example 4 was diluted with methyl isobutyl ketone in the measurement glass cell of a spectrophotometer so that the visible light transmittance was 70%, and measurement was performed at interval of 5 nm in the wavelength range of 200 nm to 2600 nm by the spectrophotometer (U-4100 manufactured by Hitachi, Ltd.) to calculate the solar radiation transmittance, it was 47.2%. Note that the visible light transmittance and the solar radiation transmittance were calculated based on JIS R 3106. Further, in this measurement, the incident direction of the light of the spectrophotometer was set to be perpendicular to the measurement glass cell. Further, a blank solution containing only methyl isobutyl ketone as a solvent in the measurement glass cell is used as the baseline of light transmittance.

Further, the composite tungsten oxide ultrafine particle dispersion liquid of comparative example 4 was mixed with ultraviolet curing resin and methyl isobutyl ketone as a solvent to prepare a coating liquid. The surface of the glass substrate having a thickness of 3 mm was coated with the coating liquid using a bar coater to form a coating layer. After the solvent was evaporated from the coating layer, the coating layer was irradiated with ultraviolet rays and cured, to obtain a cured layer. At this time, the concentration of the dispersion liquid was adjusted by diluting the solvent with methyl isobutyl ketone in advance so that the cured layer had a visible light transmittance of 70%.

When the average particle size of the composite tungsten oxide ultrafine particles dispersed in the obtained cured layer of comparative example 4 was calculated by an image processing device using a transmission electron microscope image, it was 120 nm.

When the haze of the obtained cured layer of comparative example 4 was measured, it was 1.8%. Further, when the transmittance of the obtained cured layer of comparative example 4 was measured at intervals of 5 nm in the wavelength range of 200 nm to 2600 nm to obtain the solar radiation transmittance from the obtained transmission profile, it was 48.3%. Further, the presence or absence of the blue haze phenomenon of the cured layer of comparative example 4 was visually confirmed in the same manner as in example 2, and it was confirmed that there was the blue haze phenomenon.

Table 1 and Table 2 show the production conditions of the composite tungsten oxide ultrafine particles of comparative example 4 and the evaluation results of the dispersion liquid, its coating layer, and its cured layer.

CONCLUSION

As is apparent from Table 2, the composite tungsten oxide ultrafine particles of examples 1 to 35, exhibited excellent near infrared shielding properties with a solar radiation transmittance of 47% or less, compared to the composite tungsten oxide ultrafine particles of comparative examples 1 to 4.

Further, the composite tungsten oxide ultrafine particles contained in the dispersion liquid of examples 2 to 35 were the composite tungsten oxide ultrafine particles having the XRD peak top intensity ratio to the XRD peak intensity being 0.13 or more, with the plane (220) of the silicon powder standard sample (NIST, 640 c) as a reference, and having a crystallite size of 1 nm or more and having no hetero phase. Further, in the examples, the average particle size and the crystallite size of each composite tungsten oxide ultrafine particle in the cured layer are almost the same, and therefore the composite tungsten oxide ultrafine particles of the examples are considered to be single crystal composite tungsten oxide ultrafine particles having less than 50% volume ratio of an amorphous phase. In contrast, the average particle size is larger than the crystallite size in the composite tungsten oxide ultrafine particles of comparative examples 1, 2 and 4, and therefore the composite tungsten oxide ultrafine particles of comparative examples 1, 2 and 4 are not considered to be single crystals. Further, in comparative example 3, different phases ($WO_2$ and W) were generated.

TABLE 1

| | | Firing condition | | | | | | | | Pulverization and dispersion condition | | |
|---|---|---|---|---|---|---|---|---|---|---|---|---|
| | | Thermal plasma method | | | | | Solid phase reaction method | | | | | |
| | Raw material | Plasma temperature [K] | *1 [kW] | Carrier gas(Ar) [L/min] | Plasma gas(Ar) [L/min] | Sheath gas [L/min] | *2 [g/min] | *3 [°C.] | in-furnace gas | Firing time | Solvent | *4 [hr] | Drying treatment device |
| Examples 1-2 | $Cs_2CO_3$&$H_2WO_4$ | 10000~15000 | 40 | 9 | 30 | Ar55 He5 | 50 | — | — | — | MIBX | 1 | — |
| Examples 3 | $Cs_2CO_3$&$H_2WO_4$ | 10000~15000 | 40 | 8 | 30 | Ar55 He5 | 25 | — | — | — | MIBX | 1 | — |
| Examples 4 | $Cs_2CO_3$&$H_2WO_4$ | 10000~15000 | 40 | 6 | 30 | Ar55 He5 | 25 | — | — | — | MIBX | 1 | — |
| Examples 5 | $Cs_2CO_3$&$H_2WO_4$ | 10000~15000 | 40 | 9 | 45 | Ar55 He5 | 50 | — | — | — | MIBX | 1 | — |
| Examples 6 | $Cs_2CO_3$&$H_2WO_4$ | 10000~15000 | 40 | 9 | 30 | Ar55 He5 | 50 | — | — | — | MIBX | 1 | — |
| Examples 7 | $Cs_2CO_3$&$H_2WO_4$ | 10000~15000 | 40 | 6 | 45 | Ar55 He5 | 25 | — | — | — | MIBX | 1 | — |
| Examples 8 | $Cs_{0.33}WO_3$ | 10000~15000 | 40 | 9 | 30 | Ar55 He5 | 50 | — | — | — | MIBX | 1 | — |
| Examples 9 | $Cs_{0.33}WO_3$ | 10000~15000 | 40 | 9 | 30 | Ar55 He5 | 25 | — | — | — | MIBX | 1 | — |
| Examples 10 | $Rb_2CO_3$&$H_2WO_4$ | 10000~15000 | 40 | 9 | 30 | Ar55 He5 | 50 | — | — | — | MIBX | 1 | — |
| Examples 11 | $K_2CO_3$&$H_2WO_4$ | 10000~15000 | 40 | 9 | 30 | Ar55 He5 | 50 | — | — | — | MIBX | 1 | — |
| Examples 12 | $TiNO_3$&$H_2WO_4$ | 10000~15000 | 40 | 8 | 30 | Ar55 He5 | 50 | — | — | — | MIBX | 1 | — |
| Examples 13 | $BaCO_3$&$H_2WO_4$ | 10000~15000 | 40 | 9 | 30 | Ar55 He5 | 50 | — | — | — | MIBX | 1 | — |
| Examples 14 | $K_2CO_3$&$Cs_2CO_3$& $H_2WO_4$ | 10000~15000 | 40 | 9 | 30 | Ar55 He5 | 50 | — | — | — | MIBX | 1 | — |
| Examples 15 | $Cs_2CO_3$&$H_2WO_4$ | | | | — | | | 800 800 | $N_2$ carrier, 2% $H_2$ $N_2$ atmosphere | 30 min 90 min | MIBX | 4 | — |
| Examples 16 | $Li_2CO_3$&$H_2WO_4$ | 10000~15000 | 40 | 9 | 30 | Ar55 He5 | 50 | — | — | — | MIBX | 1 | — |
| Examples 17 | $Na_2CO_3$&$H_2WO_4$ | 10000~15000 | 40 | 9 | 30 | Ar55 He5 | 50 | — | — | — | MIBX | 1 | — |
| Examples 18 | $Cu(NO_3)_2 \cdot 3H_2O$& $H_2WO_4$ | 10000~15000 | 40 | 9 | 30 | Ar55 He5 | 50 | — | — | — | MIBX | 1 | — |
| Examples 19 | $Ag_2CO_3$&$H_2WO_4$ | 10000~15000 | 40 | 9 | 30 | Ar55 He5 | 50 | — | — | — | MIBX | 1 | — |
| Examples 20 | $CaCO_3$&$H_2WO_4$ | 10000~15000 | 40 | 9 | 30 | Ar55 He5 | 50 | — | — | — | MIBX | 1 | — |
| Examples 21 | $SrCO_3$&$H_2WO_4$ | 10000~15000 | 40 | 9 | 30 | Ar55 He5 | 50 | — | — | — | MIBX | 1 | — |
| Examples 22 | $In_2O_3$&$H_2WO_4$ | 10000~15000 | 40 | 9 | 30 | Ar55 He5 | 50 | — | — | — | MIBX | 1 | — |
| Examples 23 | $SnO_2$&$H_2WO_4$ | 10000~15000 | 40 | 9 | 30 | Ar55 He5 | 50 | — | — | — | MIBX | 1 | — |

TABLE 1-continued

| | | Firing condition | | | | | | | | Pulverization and disperison condition | | |
|---|---|---|---|---|---|---|---|---|---|---|---|---|
| | | Thermal plasma method | | | | | Solid phase reaction method | | | | | |
| | Raw material | Plasma temperature [K] | *1 [kW] | Carrier gas(Ar) [L/min] | Plasma gas(Ar) [L/min] | Sheath gas [L/min] | *2 [g/min] | *3 [° C.] | in-furnance gas | Firing time | Solvent | *4 [hr] | Drying treatment device |
| Examples 24 | $Yb_2O_3$&$H_2WO_4$ | 10000~15000 | 40 | 9 | 30 | Ar55 He5 | 50 | — | — | — | MIBX | 1 | — |
| Examples 25 | Snowtex S&$H_2WO_4$ | 10000~15000 | 40 | 9 | 30 | Ar55 He5 | 50 | — | — | — | MIBX | 1 | — |
| Examples 26 | $Cs_2CO_3$&$H_2WO_4$ | | | — | | | | 800 800 | $N_2$ carrier, 5% $H_2$ $N_2$ atmosphere | 1 hr 2 hr | Water | 4 | Air dryer |
| Examples 27 | $Cs_2CO_3$&$H_2WO_4$ | | | — | | | | 800 800 | $N_2$ carrier, 5% $H_2$ $N_2$ atmosphere | 1 hr 2 hr | Water | 4 | Ishikawa type stirring type mash-crushing machine |
| Examples 28 | $Cs_2CO_3$&$H_2WO_4$ | | | — | | | | 800 800 | $N_2$ carrier, 5% $H_2$ $N_2$ atmosphere | 1 hr 2 hr | Water | 4 | Spray dryer |
| Examples 29 | $Cs_2CO_3$&$H_2WO_4$ | | | — | | | | 800 800 | $N_2$ carrier, 5% $H_2$ $N_2$ atmosphere | 1 hr 2 hr | Water | 2 | Air dryer |
| Examples 30 | $Cs_2CO_3$&$H_2WO_4$ | | | — | | | | 800 800 | $N_2$ carrier, 5% $H_2$ $N_2$ atmosphere | 1 hr 2 hr | Water | 2 | Ishikawa type stirring type mash-crushing machine |
| Examples 31 | $Cs_2CO_3$&$H_2WO_4$ | | | — | | | | 800 800 | $N_2$ carrier, 5% $H_2$ $N_2$ atmosphere | 1 hr 2 hr | Water | 2 | Spray dryer |
| Examples 32 | $Cs_2CO_3$&$H_2WO_4$ | | | — | | | | 800 800 | $N_2$ carrier, 5% $H_2$ $N_2$ atmosphere | 1 hr 2 hr | *5 | 2 | Air dryer |
| Examples 33 | $Cs_2CO_3$&$H_2WO_4$ | | | — | | | | 800 800 | $N_2$ carrier, 5% $H_2$ $N_2$ atmosphere | 1 hr 2 hr | *5 | 2 | Ishikawa type stirring type mash-crushing machine |
| Examples 34 | $Cs_2CO_3$&$H_2WO_4$ | | | — | | | | 800 800 | $N_2$ carrier, 5% $H_2$ $N_2$ atmosphere | 1 hr 2 hr | *5 | 2 | Spray dryer |
| Examples 35 | $Cs_2CO_3$&$H_2WO_4$ | Same as examples 1 to 2 | | | | | | | | | MIBX | 1* | — |
| Comparative example 1 | $Cs_2CO_3$&$H_2WO_4$ | 10000~15000 | 40 | 3 | 30 | Ar55 He5 | 15 | | — | | MIBX | 1 | — |
| Comparative example 2 | $Cs_2CO_3$&$H_2WO_4$ | 10000~15000 | 40 | 9 | 15 | Ar55 He5 | 50 | | — | | MIBX | 1 | — |
| Comparative example 3 | $Cs_2CO_3$&$H_2WO_4$ | 5000~10000 | 13 | 9 | 30 | Ar55 He5 | 50 | | — | | MIBX | 1 | — |
| Comparative example 4 | $Cs_2CO_3$&$H_2WO_4$ | | | | | | | 800 800 | $N_2$ carrier, 5% $H_2$ $N_2$ atmosphere | 1 hr 2 hr | Water | 40 | Air dryer |

Wherein 1* ultrasonic homogenizer 1 hr
*1 High-frequency power
*2 Raw material feed rate
*3 In-furnace temperature
*4 Pulverization and dispersion treatment time
*5 Propylene glycol monomethyl ether

TABLE 2

| | | | Peak top intensity | | Peak intensity of phase (220) of standard sample | Peak top intensity ratio | Peak position 2θ [°] | BET* [m²/g] | x/y | *1 [%] | Dispersion liquid | | | | Cured layer | | | | |
|---|---|---|---|---|---|---|---|---|---|---|---|---|---|---|---|---|---|---|---|
| | | | | | | | | | | | Dispersed particle size [nm] | Crystallite size [nm] | *2 [%] | *3 [%] | Particle size [nm] | Haze [%] | *2 [%] | *3 [%] | Blue haze |
| | Crystal structure | Hetero phase | *4 [Count] | After Dispersion [Count] | | | | | | | | | | | | | | | |
| Example 1-2 | Hexagonal crystal structure | Absent | 4200 | 3000 | 19800 | 0.15 | 27.8 | 60.0 | 0.29 | 1.8 | 70 | 18.0 | 70 | 34.8 | 17 | 0.4 | 70 | 38.5 | Absent |
| Example 3 | Hexagonal crystal structure | Absent | 4700 | 3400 | 19800 | 0.17 | 27.8 | 51.6 | 0.29 | 1.5 | 80 | 18.5 | 70 | 34.7 | 18 | 0.4 | 70 | 38.4 | Absent |
| Example 4 | Hexagonal crystal structure | Absent | 5400 | 4200 | 19800 | 0.21 | 27.8 | 41.6 | 0.29 | 1.4 | 80 | 21.1 | 70 | 34.7 | 21 | 0.4 | 70 | 38.4 | Absent |
| Example 5 | Hexagonal crystal structure | Absent | 4500 | 3100 | 10500 | 0.16 | 27.8 | 54.8 | 0.29 | 1.6 | 80 | 18.7 | 70 | 34.8 | 18 | 0.4 | 70 | 36.5 | Absent |
| Example 6 | Hexagonal crystal structure | Absent | 4400 | 3100 | 19800 | 0.18 | 27.8 | 57.0 | 0.29 | 1.6 | 70 | 17.9 | 70 | 38.3 | 18 | 0.4 | 70 | 34.0 | Absent |
| Example 7 | Hexagonal crystal structure | Absent | 5800 | 4500 | 19800 | 0.23 | 27.8 | 37.8 | 0.30 | 1.3 | 80 | 28.2 | 70 | 34.3 | 28 | 0.4 | 70 | 35.9 | Absent |
| Example 8 | Hexagonal crystal structure | Absent | 8200 | 4000 | 19800 | 0.20 | 27.8 | 44.7 | 0.28 | 1.4 | 80 | 23.0 | 70 | 34.2 | 22 | 0.4 | 70 | 36.1 | Absent |
| Example 9 | Hexagonal crystal structure | Absent | 5700 | 4400 | 19800 | 0.22 | 27.8 | 38.3 | 0.30 | 1.3 | 80 | 28.0 | 70 | 34.4 | 20 | 0.4 | 70 | 36.2 | Absent |
| Example 10 | Hexagonal crystal structure | Absent | 4000 | 3000 | 19800 | 0.13 | 27.9 | 62.5 | 0.32 | — | 70 | 17.2 | 70 | 37.3 | 17 | 0.4 | 70 | 39.2 | Absent |
| Example 11 | Hexagonal crystal structure | Absent | 3600 | 2900 | 19800 | 0.15 | 27.9 | 64.2 | 0.27 | — | 70 | 17.5 | 70 | 41.8 | 17 | 0.4 | 70 | 42.8 | Absent |
| Example 12 | Hexagonal crystal structure | Absent | 4000 | 2300 | 19800 | 0.15 | 27.9 | 62.3 | 0.10 | — | 60 | 18.5 | 70 | 40.7 | 18 | 0.4 | 70 | 42.8 | Absent |
| Example 13 | Hexagonal crystal structure | Absent | 4200 | 3100 | 19800 | 0.16 | 28.1 | 60.8 | 0.14 | — | 70 | 17.3 | 70 | 41.1 | 17 | 0.4 | 70 | 42.9 | Absent |
| Example 14 | Hexagonal crystal structure | Absent | 4000 | 2200 | 19800 | 0.18 | 28.0 | 62.3 | 0.39 | — | 80 | 18.0 | 70 | 48.3 | 18 | 0.4 | 70 | 40.2 | Absent |
| Example 15 | Hexagonal crystal structure | Absent | 22000 | 4200 | 19800 | 0.21 | 27.8 | 1.2 | 0.33 | — | 80 | 23.9 | 70 | 34.6 | 23 | 0.3 | 70 | 35.6 | Absent |
| Example 16 | Cubic crystal structure | Absent | 3600 | 2600 | 19800 | 0.13 | 23.9 | 110.3 | 0.30 | — | 70 | 16.1 | 70 | 41.1 | 18 | 0.4 | 70 | 43.2 | Absent |
| Example 17 | Tetragonal crystal structure | Absent | 2600 | 2600 | 19800 | 0.13 | 23.4 | 90.3 | 0.10 | — | 70 | 18.9 | 70 | 42.5 | 17 | 0.4 | 70 | 44.3 | Absent |
| Example 18 | Monodine | Absent | 3700 | 2700 | 19800 | 0.14 | 23.1 | 71.3 | 0.27 | — | 70 | 17.5 | 70 | 42.0 | 17 | 0.4 | 70 | 44.9 | Absent |
| Example 19 | Orthorhombic crystal structure | Absent | 4100 | 2200 | 19800 | 0.16 | 24.2 | 62.9 | 0.01 | — | 10 | 17.8 | 70 | 42.4 | 17 | 0.4 | 70 | 44.1 | Absent |
| Example 20 | Tetragonal crystal structure | Absent | 4000 | 3100 | 19800 | 0.16 | 23.5 | 61.0 | 0.10 | — | 70 | 17.5 | 70 | 41.0 | 17 | 0.4 | 70 | 42.8 | Absent |
| Example 21 | Tetragonal crystal structure | Absent | 4100 | 3100 | 19800 | 0.16 | 23.6 | 60.5 | 0.08 | — | 70 | 17.8 | 70 | 40.1 | 17 | 0.4 | 70 | 42.2 | Absent |
| Example 22 | Tetragonal crystal structure | Absent | 4100 | 3200 | 19800 | 0.16 | 24.0 | 59.8 | 0.02 | — | 80 | 18.0 | 70 | 41.9 | 18 | 0.4 | 70 | 43.7 | Absent |

TABLE 2-continued

| | | Peak top intensity | | Peak intensity of phase (220) of standard sample | Peak top intensity ratio | Peak position 2θ [°] | BET* [m²/g] | x/y | *1 [%] | Dispersion liquid Dispersed particle size [nm] | Crystallite size [nm] | *2 [%] | *3 [%] | Cured layer Particle size [nm] | Haze [%] | *2 [%] | *3 [%] | Blue haze |
|---|---|---|---|---|---|---|---|---|---|---|---|---|---|---|---|---|---|---|
| | Crystal structure | Hetero phase | *4 [Count] | After Dispersion [Count] | | | | | | | | | | | | | | | |
| Example 23 | Tetragonal crystal structure | Absent | 4200 | 3100 | 19800 | 0.16 | 23.6 | 58.5 | 0.19 | — | 80 | 18.2 | 70 | 42.0 | 18 | 0.4 | 70 | 44.1 | Absent |
| Example 24 | Cubic crystal structure | Absent | 4400 | 3400 | 19800 | 0.17 | 23.1 | 57.1 | 0.19 | — | 80 | 18.4 | 70 | 41.9 | 18 | 0.4 | 70 | 43.5 | Absent |
| Example 25 | Monodine | Absent | 4000 | 3100 | 19800 | 0.16 | 23.5 | 61.3 | 0.04 | — | 70 | 17.7 | 70 | 41.8 | 17 | 0.4 | 70 | 43.4 | Absent |
| Example 26 | Hexagonal crystal structure | Absent | 4200 | 4200 | 19800 | 0.21 | 27.8 | 42.6 | 0.33 | 2.2 | 80 | 23.7 | 70 | 34.1 | 23 | 0.3 | 70 | 25.7 | Absent |
| Example 27 | Hexagonal crystal structure | Absent | 4200 | 4200 | 19800 | 0.21 | 27.8 | 41.2 | 0.33 | 1.5 | 80 | 24.1 | 70 | 34.1 | 24 | 0.3 | 70 | 35.8 | Absent |
| Example 28 | Hexagonal crystal structure | Absent | 4100 | 4100 | 19800 | 0.21 | 27.8 | 42.3 | 0.33 | 1.5 | 80 | 22.0 | 70 | 34.2 | 23 | 0.3 | 70 | 35.7 | Absent |
| Example 29 | Hexagonal crystal structure | Absent | 6200 | 6200 | 19800 | 0.30 | 27.8 | 34.3 | 0.33 | 1.8 | 80 | 38.2 | 70 | 24.3 | 38 | 0.3 | 70 | 36.1 | Absent |
| Example 30 | Hexagonal crystal structure | Absent | 3900 | 5900 | 19800 | 0.30 | 27.8 | 32.2 | 0.33 | 1.3 | 80 | 37.8 | 70 | 24.3 | 37 | 0.3 | 70 | 38.0 | Absent |
| Example 31 | Hexagonal crystal structure | Absent | 8000 | 6000 | 19800 | 0.28 | 27.8 | 31.3 | 0.33 | 1.3 | 80 | 38.5 | 70 | 34.5 | 38 | 0.3 | 70 | 36.3 | Absent |
| Example 32 | Hexagonal crystal structure | Absent | 3500 | 5500 | 19800 | 0.27 | 27.8 | 31.6 | 0.33 | 1.8 | 80 | 36.7 | 70 | 34.5 | 36 | 0.3 | 70 | 36.2 | Absent |
| Example 33 | Hexagonal crystal structure | Absent | 3400 | 5400 | 19800 | 0.27 | 27.8 | 22.3 | 0.33 | 1.3 | 80 | 36.3 | 70 | 34.7 | 32 | 0.3 | 70 | 36.5 | Absent |
| Example 34 | Hexagonal crystal structure | Absent | 8300 | 5300 | 19800 | 0.27 | 27.8 | 33.2 | 0.33 | 1.3 | 80 | 36.0 | 70 | 34.5 | 36 | 0.3 | 70 | 36.4 | Absent |
| Example 35 | Hexagonal crystal structure | Absent | 4200 | 4200 | 19800 | 0.21 | 27.8 | 60.0 | 0.29 | 1.8 | 70 | 16.9 | 70 | 35.0 | 18 | 0.8 | 70 | 36.9 | Absent |
| Comparative example 1 | Hexagonal crystal structure | Absent | 1000 | 1000 | 19800 | 0.05 | 27.8 | 90.2 | 0.29 | — | 80 | 8.0 | 70 | 52.2 | 20 | 0.4 | 70 | 53.2 | Absent |
| Comparative example 2 | Hexagonal crystal structure | Absent | 1100 | 1100 | 19800 | 0.06 | 27.8 | 88.0 | 0.29 | — | 80 | 8.2 | 70 | 50.9 | 23 | 0.4 | 70 | 52.1 | Absent |
| Comparative example 3 | Hexagonal crystal structure | WO₂ & W | 3200 | 2400 | 19800 | 0.12 | 27.4 | 43.0 | 0.29 | — | 80 | 22.0 | 70 | 47.1 | 23 | 0.4 | 70 | 47.8 | Absent |
| Comparative example 4 | Hexagonal crystal structure | Absent | 1300 | 1300 | 19800 | 0.07 | 27.4 | 102.8 | 0.33 | 2.2 | 120 | 8.1 | 70 | 47.2 | 120 | 1.8 | 70 | 48.3 | Present |

Wherein BET*:BET specific surface area of examples 26 to 34 belongs to the composite tungsten oxide ultrafine particles obtained by pulvertization and dispersion treatment followed by drying.
*1 Volatile component
*2 Visible light transmittance
*3 Solar radiation transmittance
*4 Raw material powder

DESCRIPTION OF SIGNS AND NUMERALS

1 Thermal plasma
2 High-frequency coil
3 Sheath gas feeding nozzle
4 Plasma gas feeding nozzle
5 Raw material powder feeding nozzle
6 Reaction vessel
7 Suction pipe
8 filter

The invention claimed is:

1. Composite tungsten oxide ultrafine particles having near-infrared shielding properties, a value of an XRD peak top intensity ratio of the composite tungsten oxide ultrafine particles is 0.13 or more when the XRD peak intensity is set to 1, with plane (220) of a silicon powder standard sample (640 c produced by NIST) as a reference.

2. The composite tungsten oxide ultrafine particles according to claim 1, expressed by a general formula $M_xW_yO_z$ wherein M element is an element of one or more kinds selected from H, He, alkali metal, alkaline earth metal, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, and Yb, W is tungsten, O is oxygen, satisfying $0.001 \leq x/y \leq 1$, $2.2 \leq z/y \leq 3.0$.

3. The composite tungsten oxide ultrafine particles according to claim 1, wherein a crystallite size of each composite tungsten oxide ultrafine particle is 1 nm or more.

4. The composite tungsten oxide ultrafine particles according to claim 1, wherein the composite tungsten oxide ultrafine particle contains a hexagonal crystal structure.

5. The composite tungsten oxide ultrafine particles according to claim 1, wherein a content of a volatile component in the composite tungsten oxide ultrafine particles is 2.5 mass % or less.

6. A composite tungsten oxide ultrafine particle dispersion liquid, in which the composite tungsten oxide ultrafine particles of claim 1 are contained in a dispersed state in a liquid medium, the liquid medium being one or more kinds selected from water, an organic solvent, a fat or oil, a liquid resin, a liquid plasticizer, a polymeric monomer, or a mixture thereof.

7. The composite tungsten oxide ultrafine particle dispersion liquid according to claim 6, wherein each composite tungsten oxide ultrafine particle contained in the composite tungsten oxide ultrafine particle dispersion liquid has a dispersed particle size of 1 nm or more and 200 nm or less.

8. The composite tungsten oxide ultrafine particle dispersion liquid according to claim 6, wherein a content of the composite tungsten oxide ultrafine particles contained in the composite tungsten oxide ultrafine particle dispersion liquid is 0.01 mass % or more and 80 mass % or less.

9. The composite tungsten oxide ultrafine particles according to claim 1, wherein a crystallite size of each composite tungsten oxide ultrafine particle is 10 nm or more and 200 nm or less.

10. The composite tungsten oxide ultrafine particles according to claim 2, wherein a crystallite size of each composite tungsten oxide ultrafine particle is 10 nm or more and 200 nm or less.

* * * * *